United States Patent
Park et al.

(10) Patent No.: US 10,782,578 B2
(45) Date of Patent: Sep. 22, 2020

(54) METHOD FOR FORMING WIRE PORTION OF LIQUID CRYSTAL CHROMIC DEVICE AND LIQUID CRYSTAL CHROMIC DEVICE

(71) Applicant: LG CHEM, LTD., Seoul (KR)

(72) Inventors: Jeong Ho Park, Daejeon (KR); Bu Gon Shin, Daejeon (KR); Eun Kyu Her, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/344,763

(22) PCT Filed: Dec. 27, 2017

(86) PCT No.: PCT/KR2017/015542
§ 371 (c)(1),
(2) Date: Apr. 24, 2019

(87) PCT Pub. No.: WO2018/124728
PCT Pub. Date: Jul. 5, 2018

(65) Prior Publication Data
US 2020/0050067 A1 Feb. 13, 2020

(30) Foreign Application Priority Data
Dec. 27, 2016 (KR) .................. 10-2016-0180381

(51) Int. Cl.
*G02F 1/1362* (2006.01)
*G02F 1/1337* (2006.01)

(52) U.S. Cl.
CPC .. *G02F 1/136286* (2013.01); *G02F 1/133711* (2013.01); *G02F 2001/136295* (2013.01)

(58) Field of Classification Search
None
See application file for complete search history.

(56) References Cited

U.S. PATENT DOCUMENTS

| | | |
|---|---|---|
| 5,702,565 A | 12/1997 | Wu et al. |
| 5,739,883 A | 4/1998 | Chen et al. |
| 6,194,318 B1 | 2/2001 | Ikeda |

(Continued)

FOREIGN PATENT DOCUMENTS

| | | |
|---|---|---|
| JP | 2005353784 A | 12/2005 |
| JP | 2006235010 A | 9/2006 |

(Continued)

*Primary Examiner* — Ryan Crockett
(74) *Attorney, Agent, or Firm* — Dentons US LLP

(57) ABSTRACT

A method for forming a wire portion of a liquid crystal chromic device. The method includes: a) preparing a liquid crystal chromic device by forming a transparent electrode on a substrate, and forming an alignment film on the transparent electrode; b) forming two or more etching lines spaced apart by a constant interval by irradiating the alignment film with a laser; and c) applying a conductive paste to a valley region of each of the two or more etching lines. The liquid crystal chromic device includes: a substrate; a transparent electrode provided on the substrate; an alignment film provided on the transparent electrode; and two or more etching lines provided on the alignment film. The two or more etching lines are spaced apart by a constant interval, and a valley region of each of the two or more etching lines is coated with a conductive paste.

18 Claims, 24 Drawing Sheets

(56) References Cited

U.S. PATENT DOCUMENTS

| | | | |
|---|---|---|---|
| 2003/0231272 A1* | 12/2003 | Nakamura | G02F 1/133703 349/123 |
| 2006/0197899 A1* | 9/2006 | Kamiya | G02F 1/1337 349/124 |
| 2013/0319749 A1* | 12/2013 | Ohashi | H05K 3/0032 174/262 |
| 2015/0378234 A1* | 12/2015 | Konkin | G02F 1/15 359/265 |
| 2016/0103367 A1 | 4/2016 | Ahn et al. | |
| 2017/0357128 A1* | 12/2017 | Kim | G02F 1/133711 |

FOREIGN PATENT DOCUMENTS

| | | |
|---|---|---|
| KR | 100297141 B1 | 9/2001 |
| KR | 100539581 B1 | 2/2006 |
| KR | 1020060097195 A | 9/2006 |
| KR | 1020070080835 A | 8/2007 |
| KR | 100814280 B1 | 3/2008 |
| KR | 100895363 B1 | 4/2009 |
| KR | 10-2013-0068375 A | 6/2013 |
| KR | 101442727 B1 | 9/2014 |
| KR | 10-2015-0037650 A | 4/2015 |
| KR | 101514726 B1 | 4/2015 |
| KR | 1020160044138 A | 4/2016 |
| WO | 2011125273 A1 | 10/2011 |

\* cited by examiner

[Figure 1]
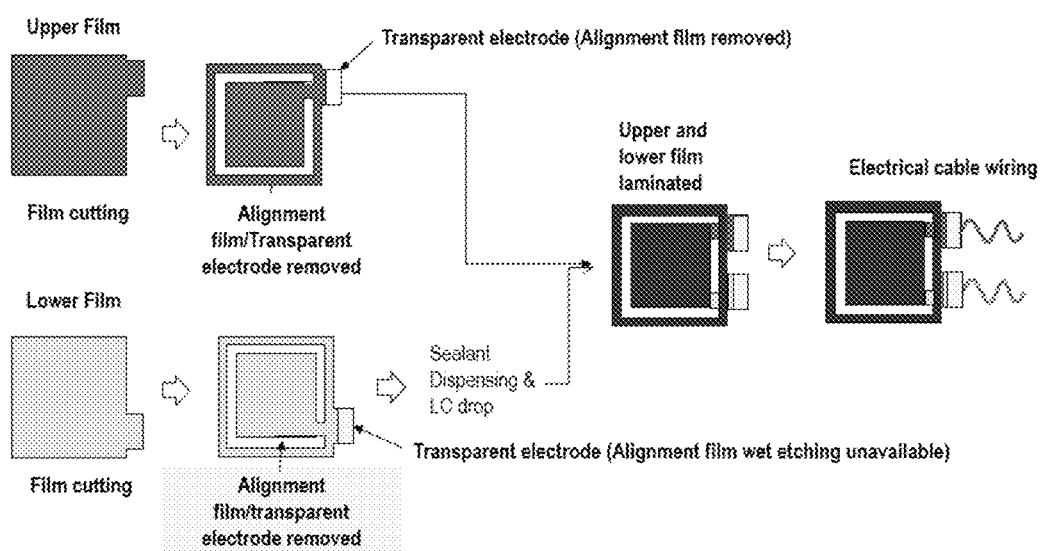

[Figure 2]
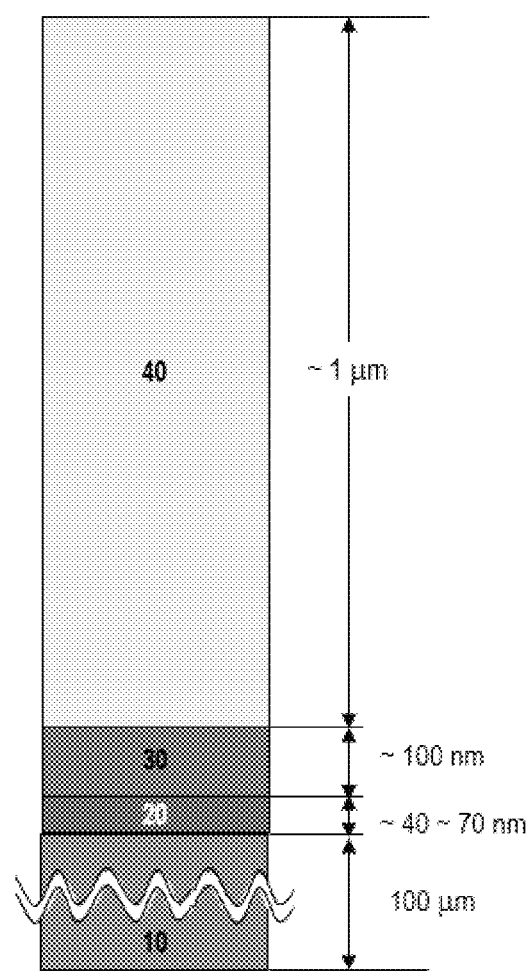

[Figure 3]
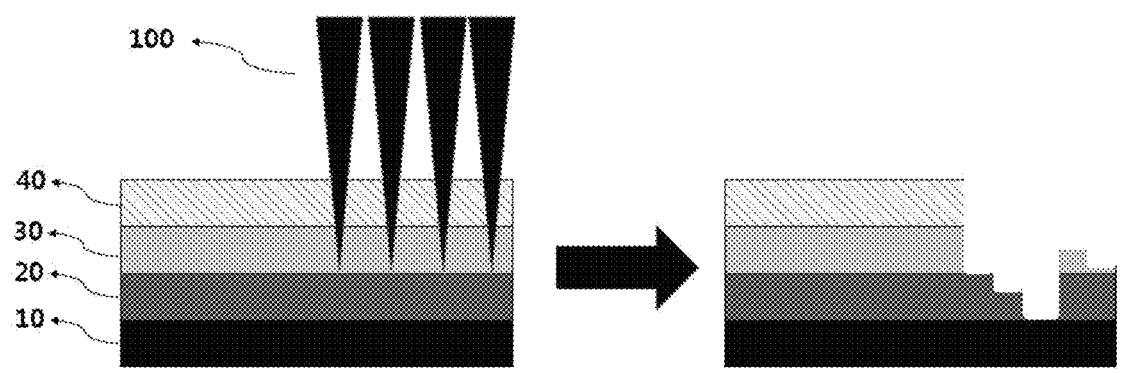

[Figure 4]
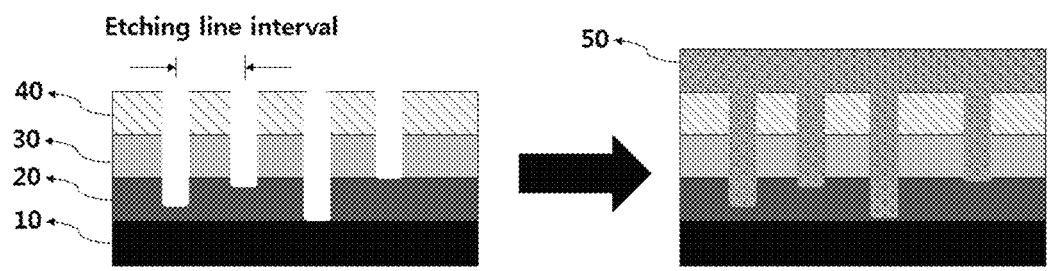

[Figure 5]
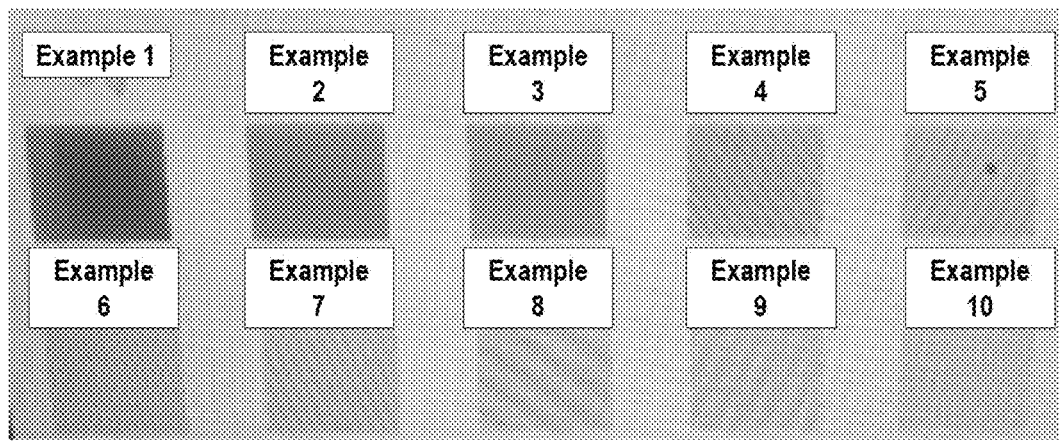

[Figure 6]
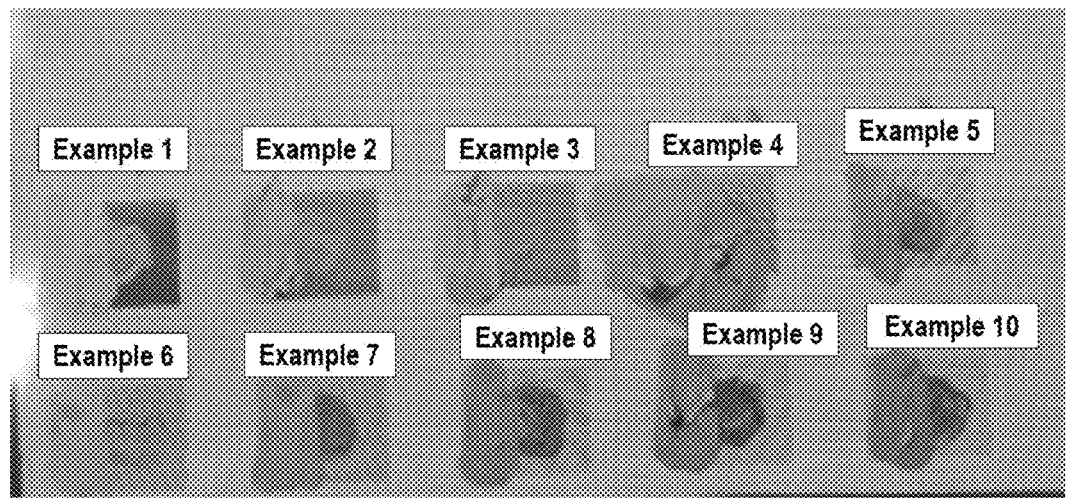

[Figure 7a]
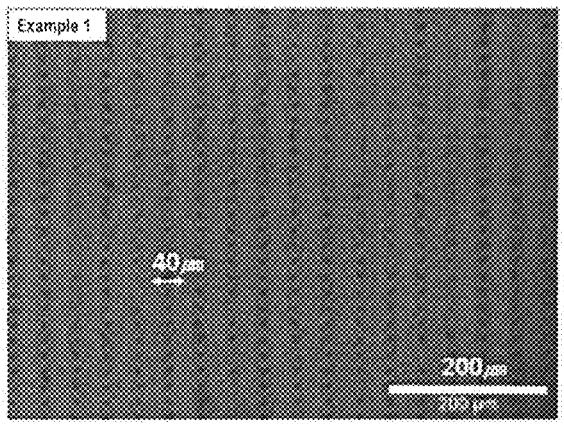
[Figure 7b]
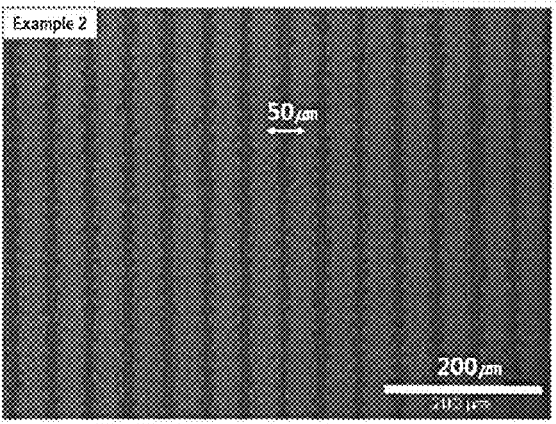
[Figure 7c]
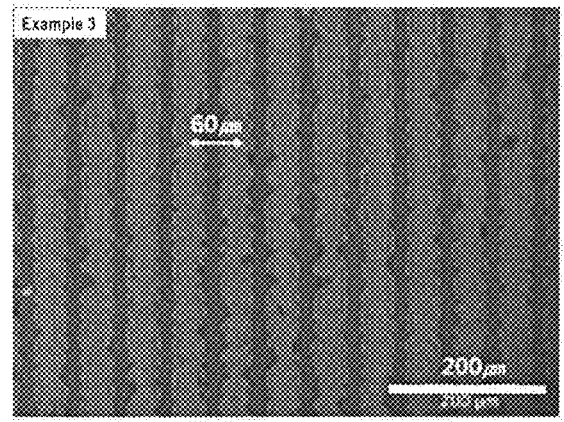
[Figure 7d]
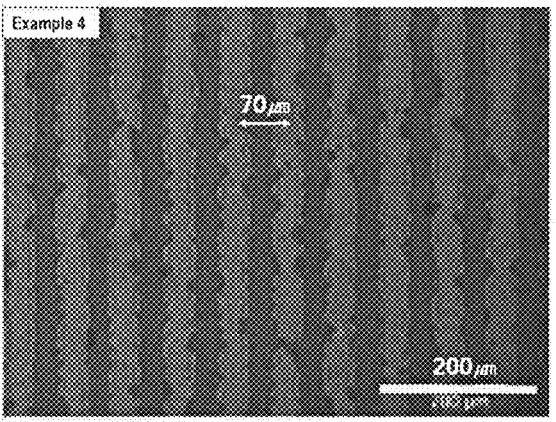
[Figure 7e]
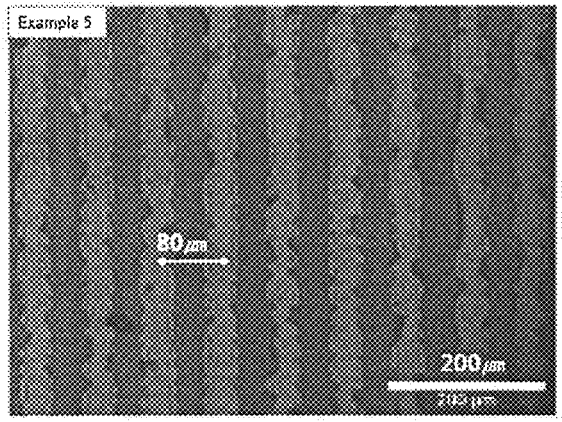
[Figure 7f]
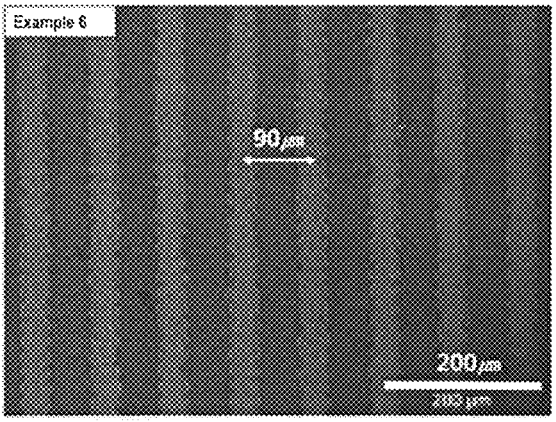

[Figure 7g]
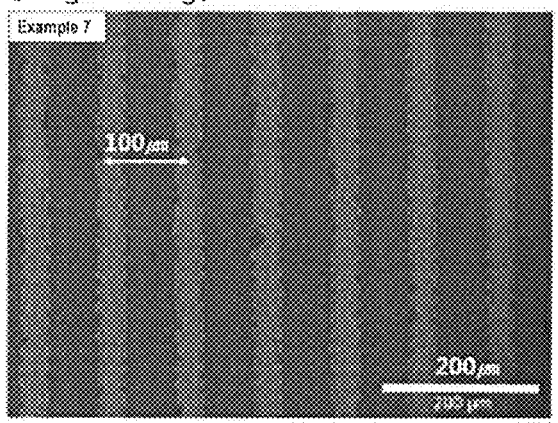
[Figure 7h]
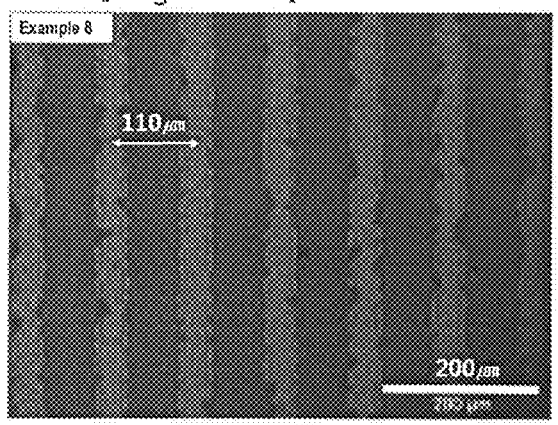
[Figure 7i]
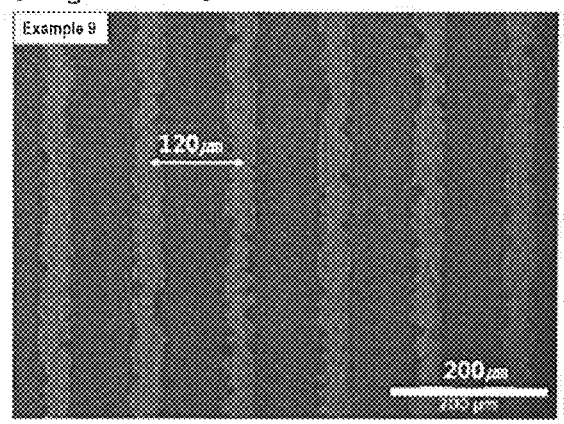
[Figure 7j]
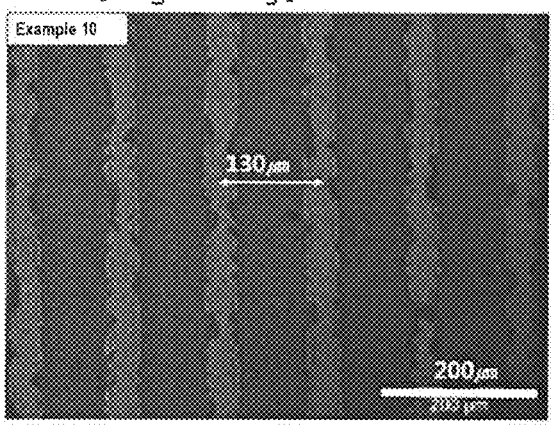

[Figure 8a]
(Reflection Mode)
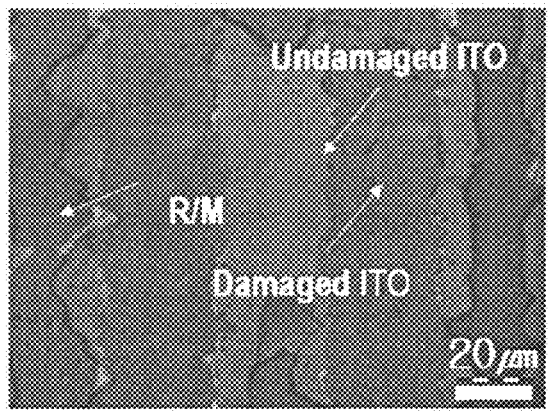
[Figure 8b]
(Transmission with cross-polarizer)
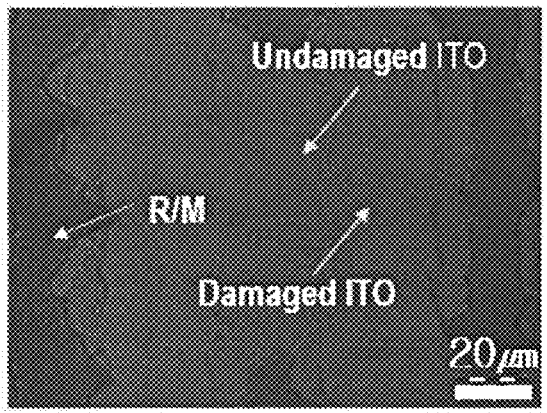

[Figure 9a]
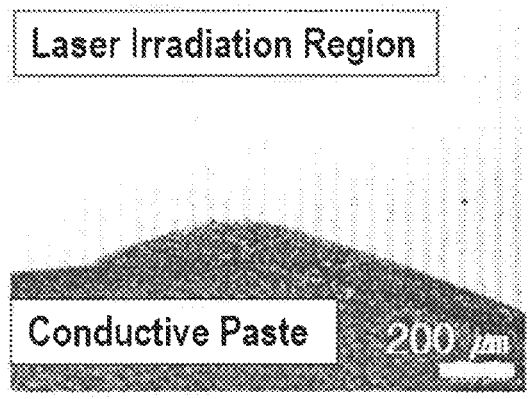
[Figure 9b]
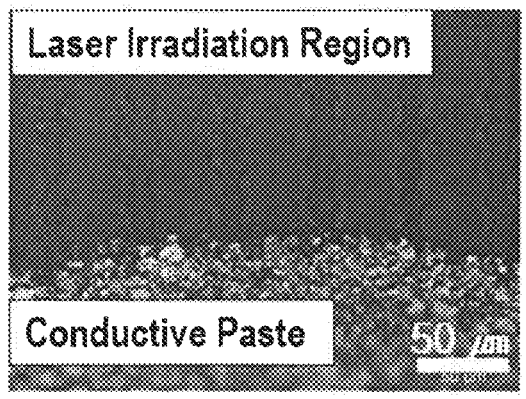

[Figure 10a]
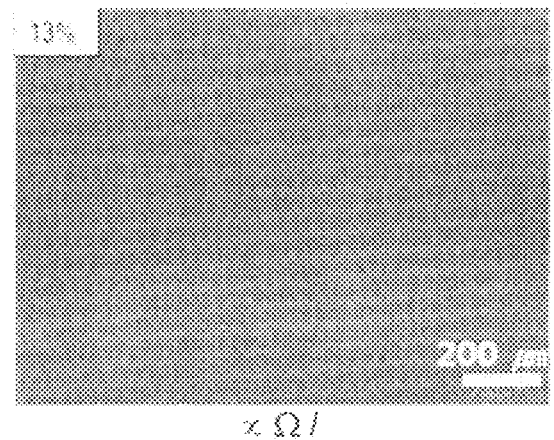
∞ Ω/
[Figure 10b]
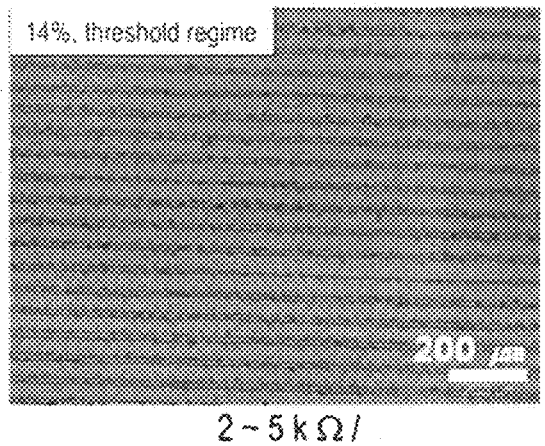
2~5 kΩ/
[Figure 10c]
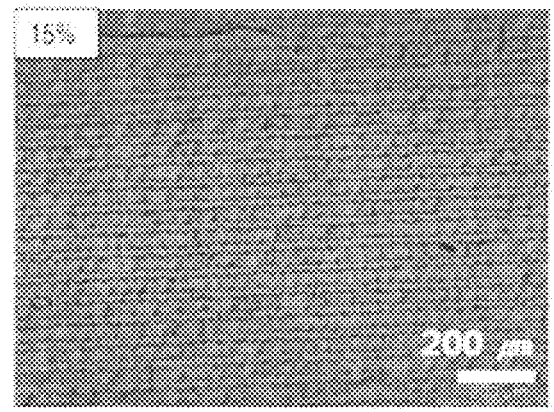
200~400 Ω/
[Figure 10d]
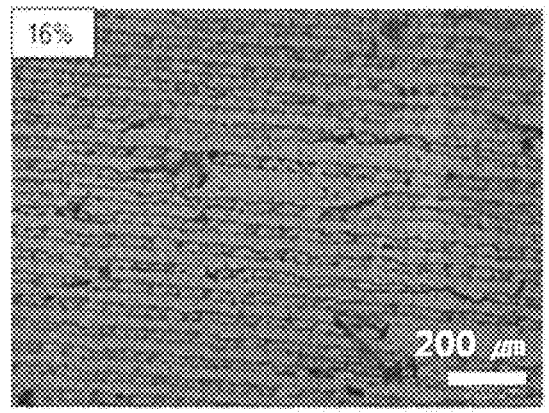
500~700 Ω/

[Figure 11a]
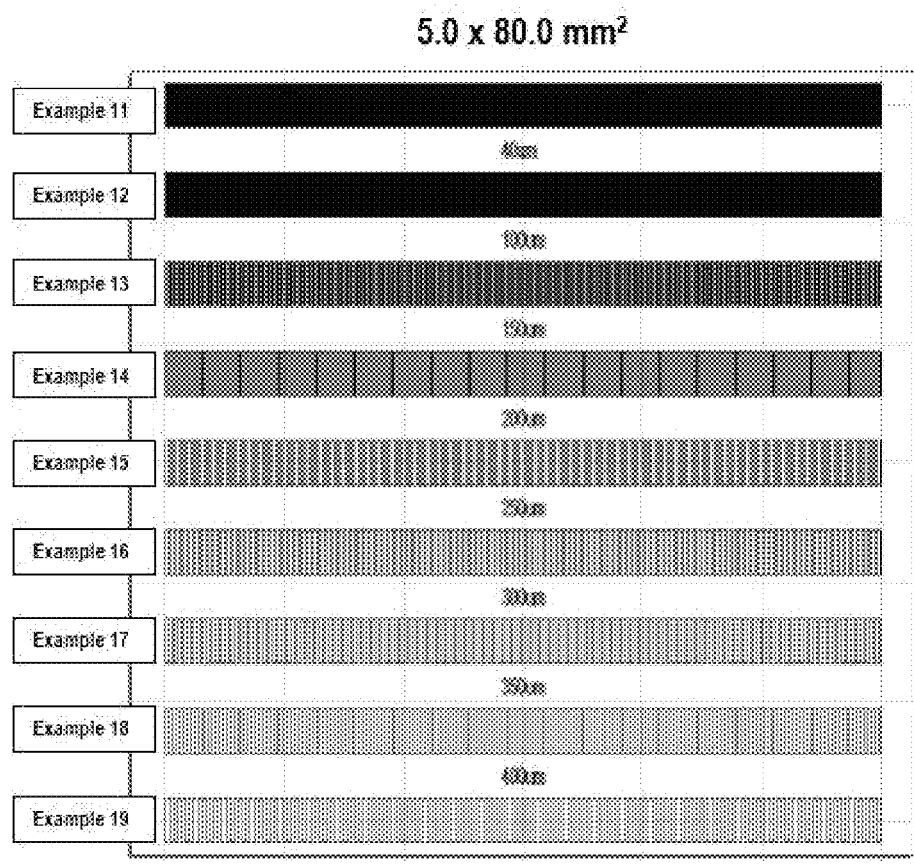

[Figure 11b]
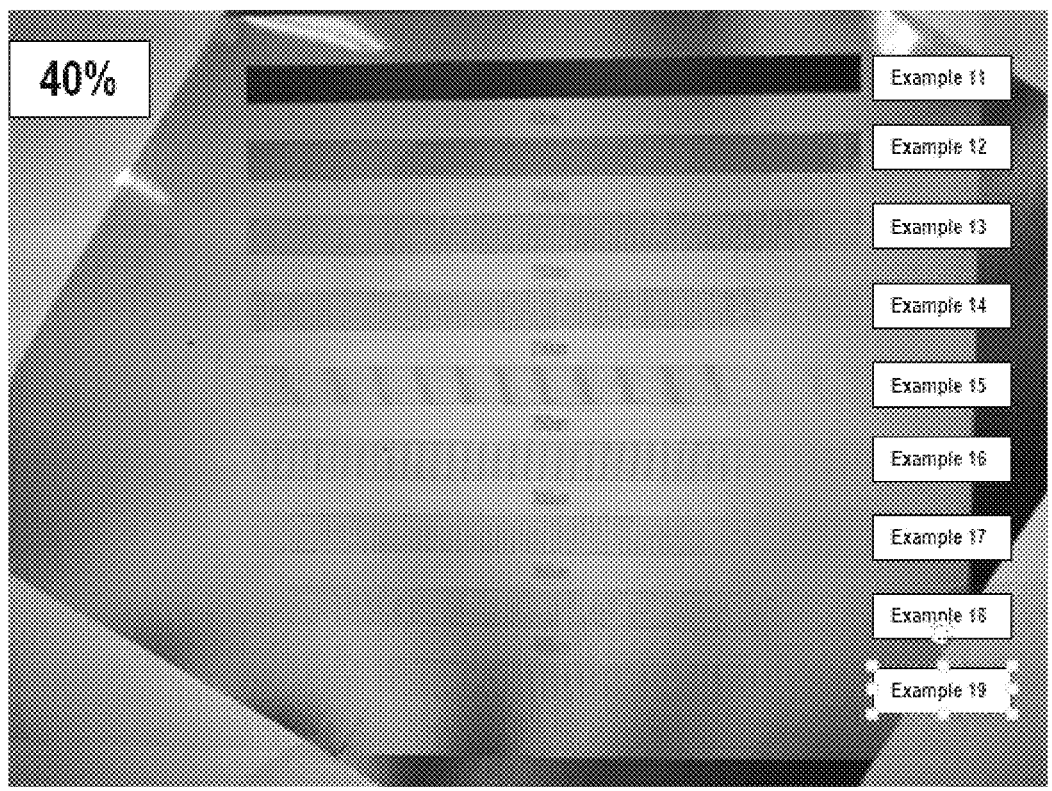

[Figure 12a]
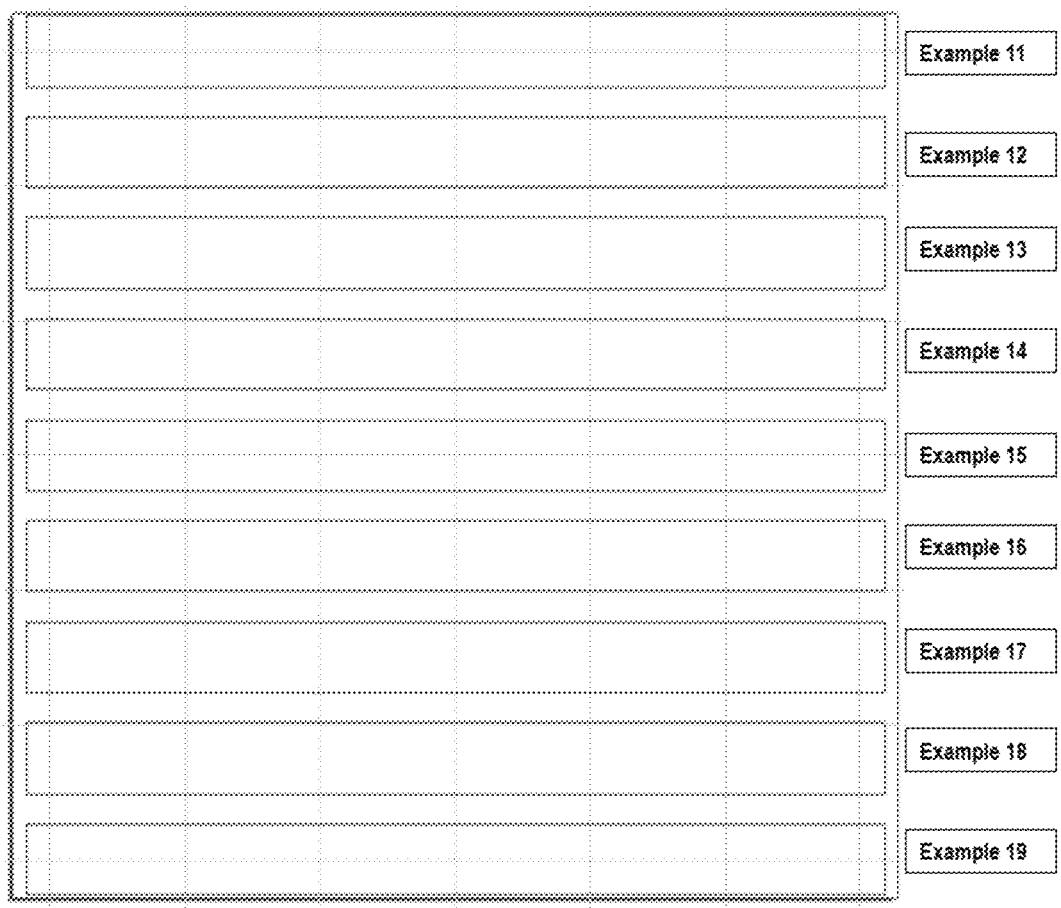

[Figure 12b]
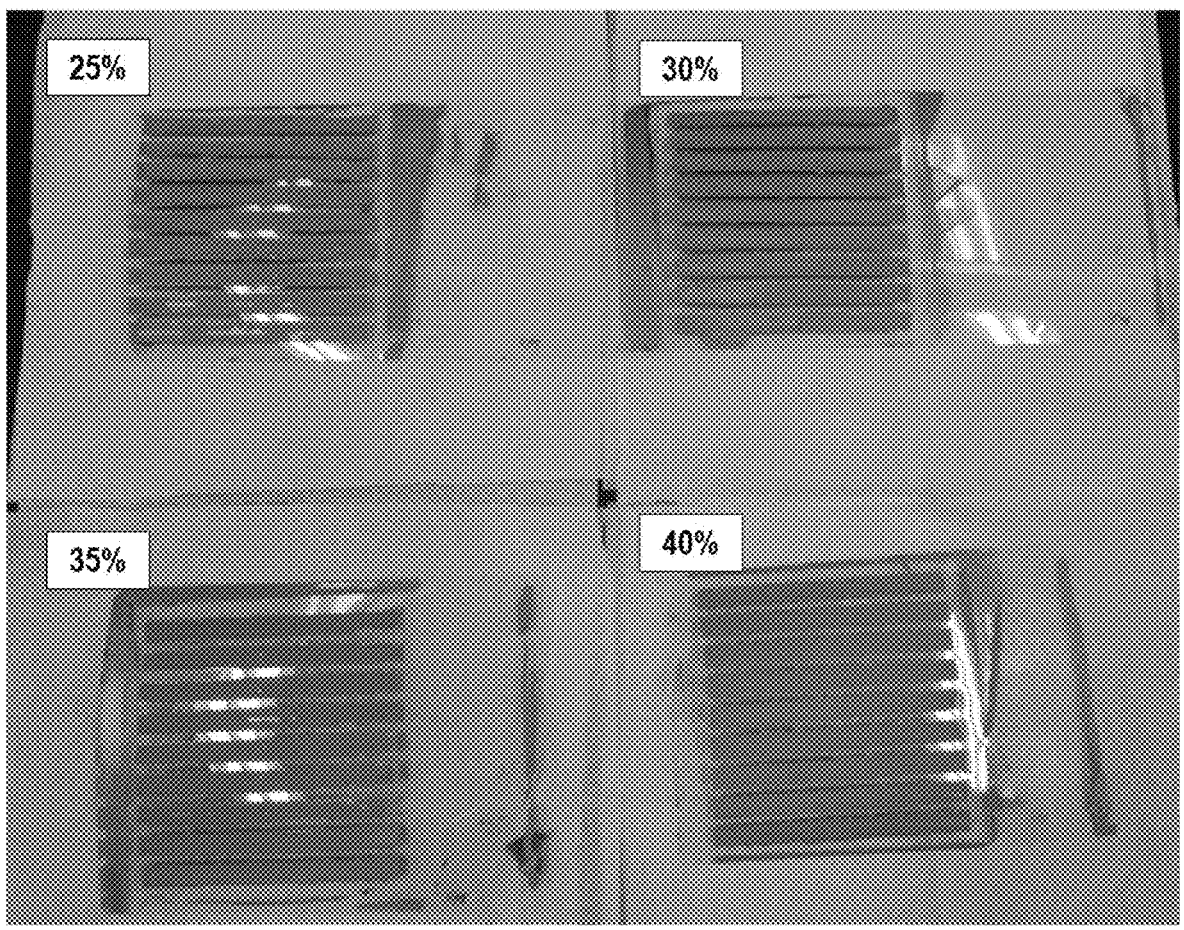

[Figure 13]
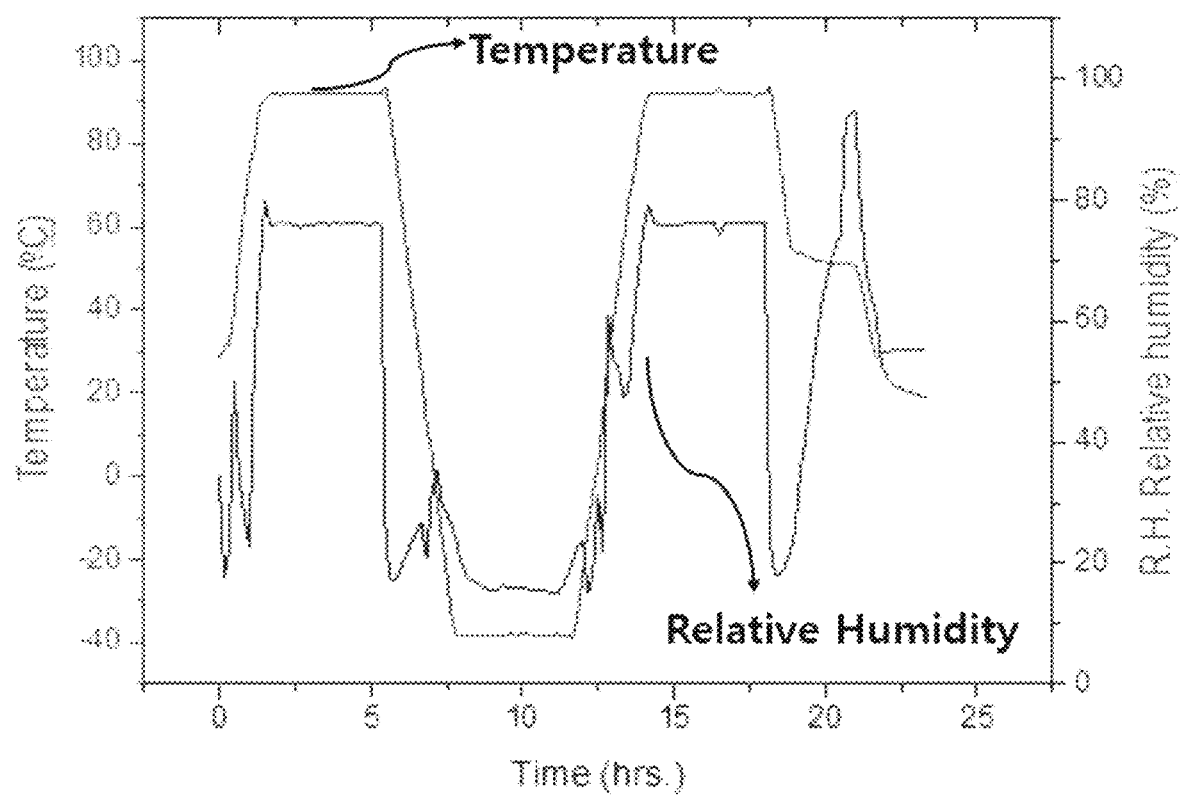

[Figure 14]
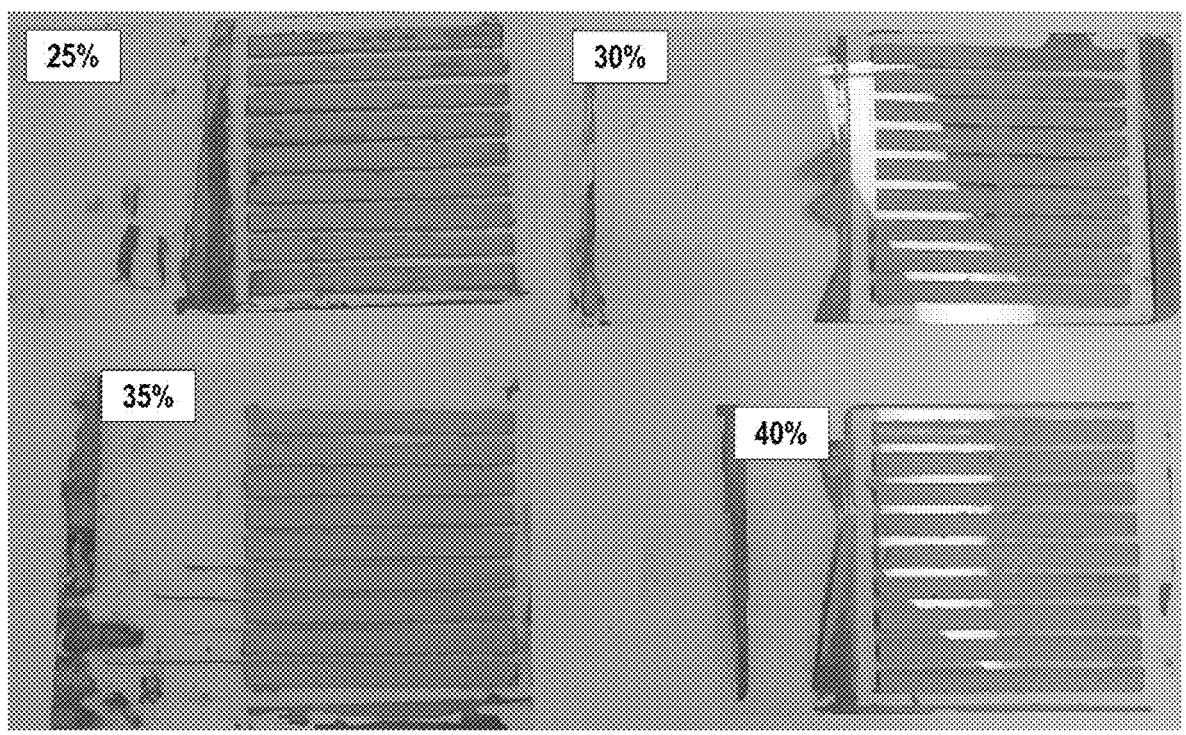

[Figure 15]
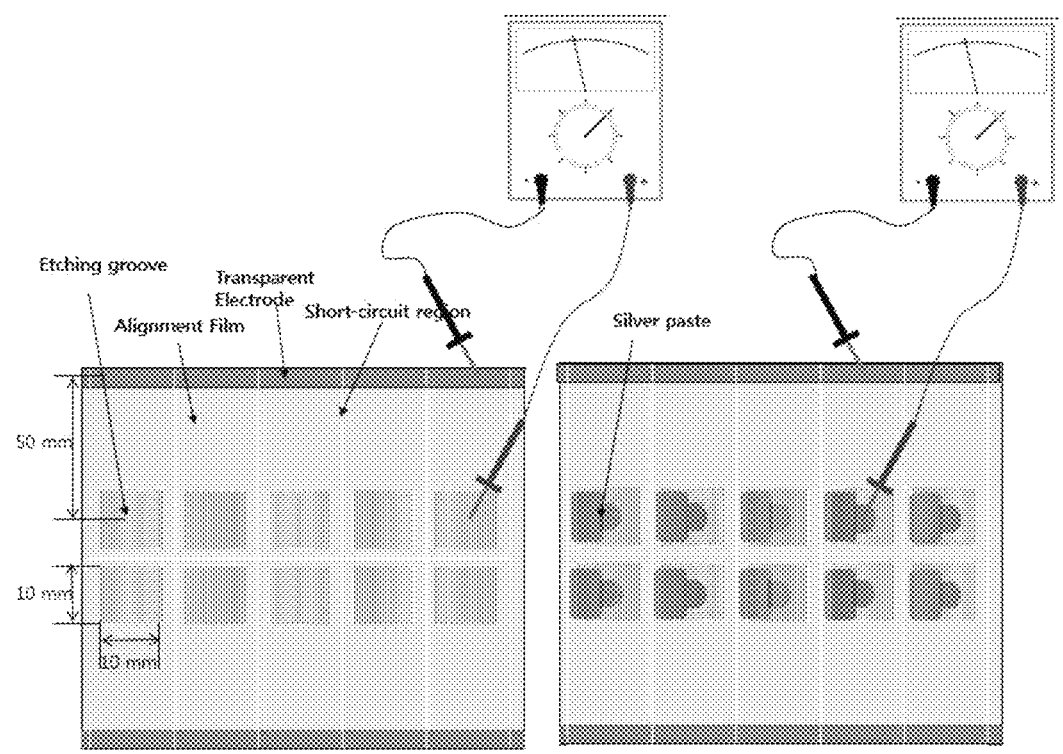

[Figure 16a]
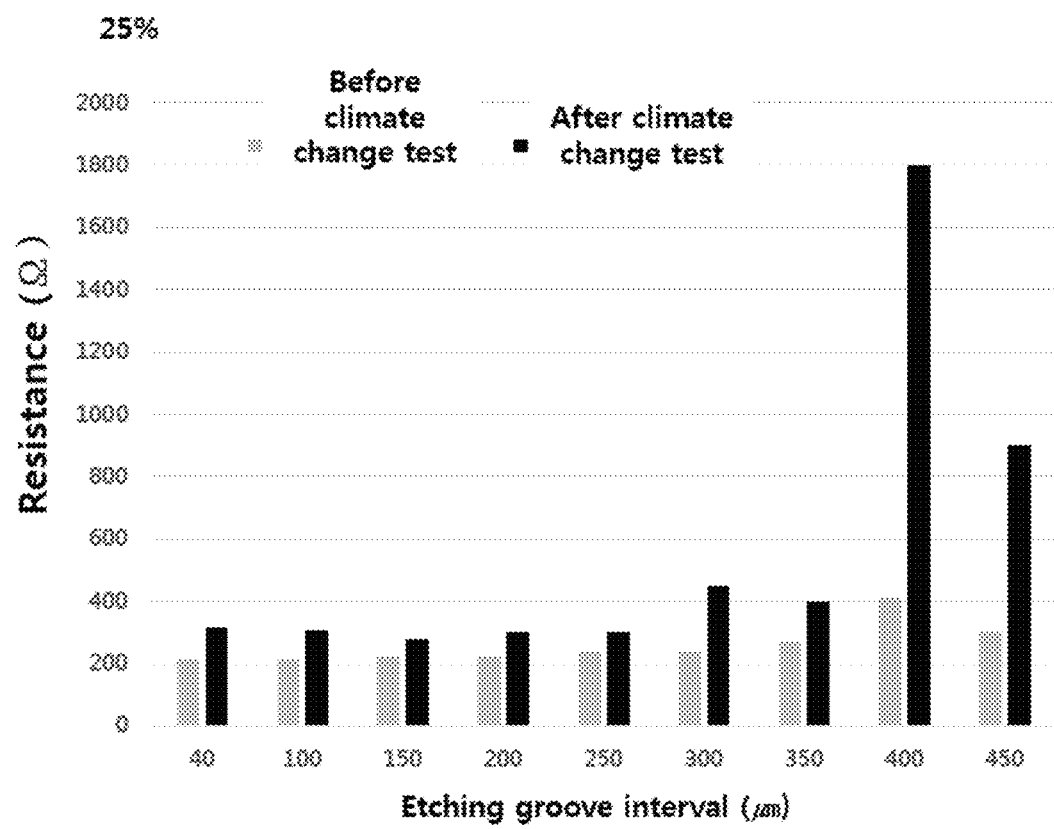

[Figure 16b]
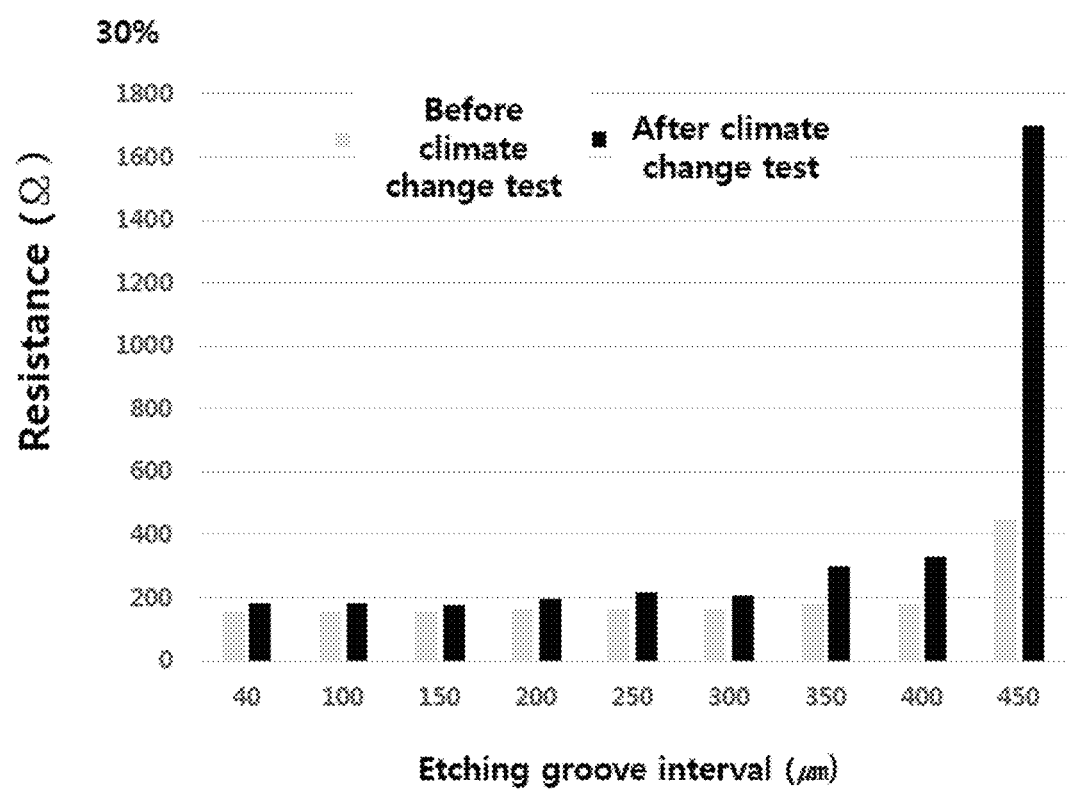

[Figure 16c]
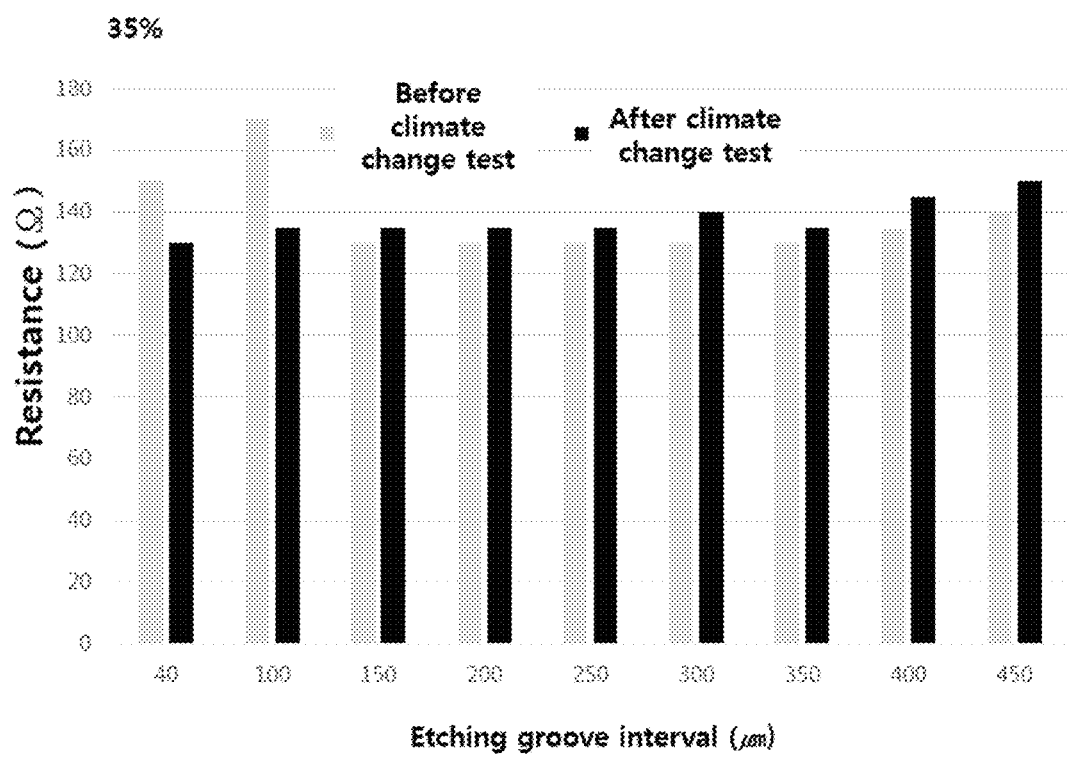

[Figure 16d]
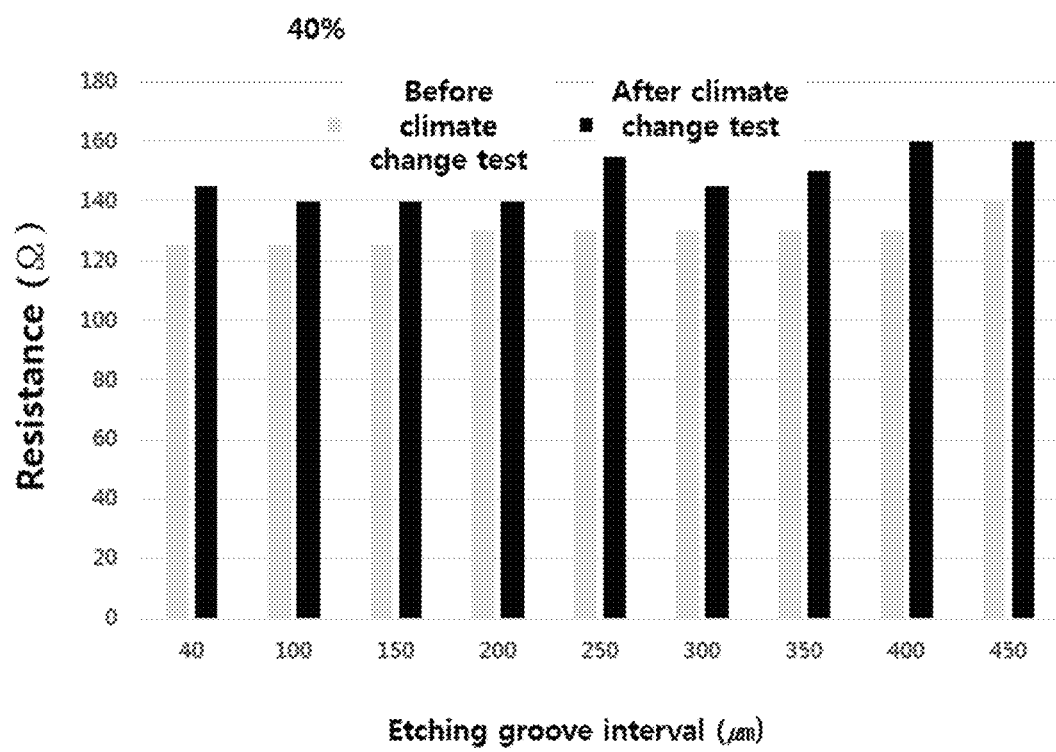

[Figure 17]
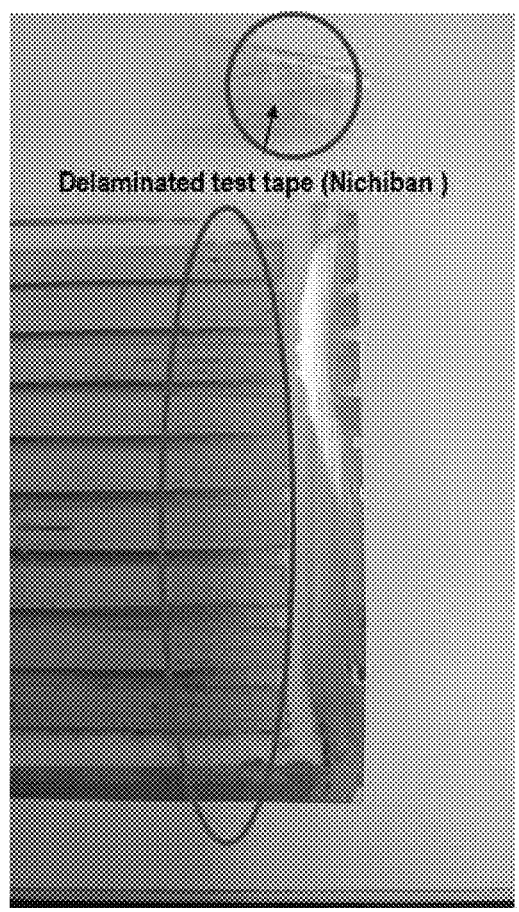

[Figure 18]
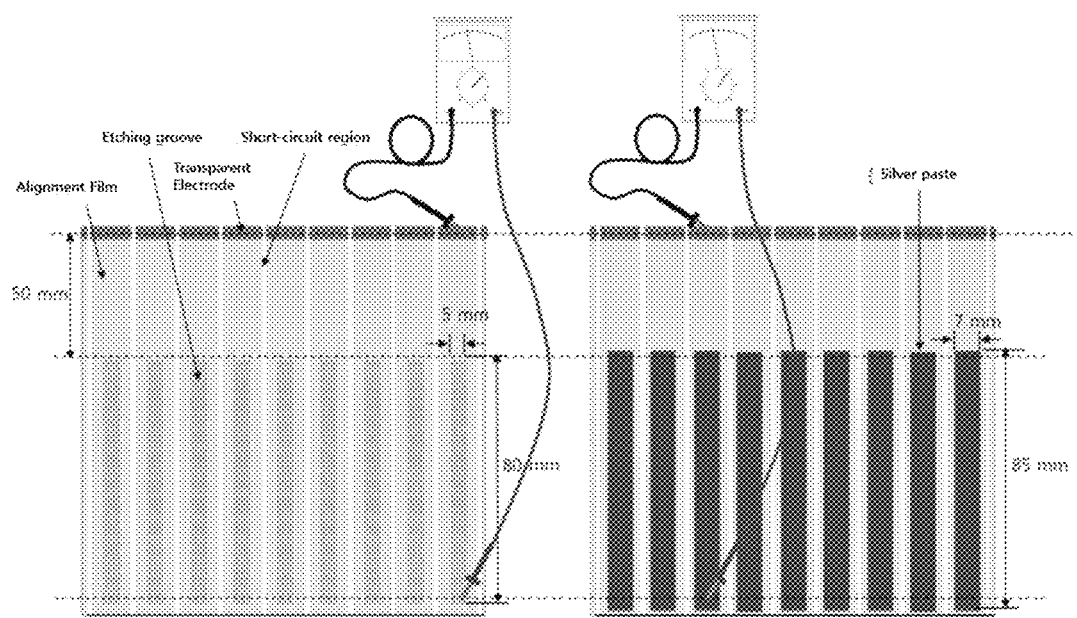

METHOD FOR FORMING WIRE PORTION OF LIQUID CRYSTAL CHROMIC DEVICE AND LIQUID CRYSTAL CHROMIC DEVICE

CROSS-REFERENCE TO RELATED APPLICATION

This application is the national stage of international Application No. PCT/KR2017/015542 filed Dec. 27, 2017, which claims priority to, and the benefit of, Korean Patent Application No. 10-2016-0180381 filed in the Korean Intellectual Property Office on Dec. 27, 2016, the entire contents of which are incorporated herein by reference.

TECHNICAL FIELD

The specification relates to a method for forming a wire portion of a liquid crystal chromic device and a liquid crystal chromic device.

BACKGROUND ART

With the rapid development of flexible electronic devices, the importance of large-area patterning processes with high productivity has been raised. Further, in implementation of the flexible electronic devices, not only a short circuit of a conductive layer for electrode formation or wiring but also a process for implementing and structuring a conductive film is required.

In the development of transmission variable liquid crystal cell films based on liquid crystal drive in applications and production of the flexible electronic devices, in detail, products such as a display, a smart window, or a sunroof, a transmissive liquid crystal based flexible device includes a multilayer structure in which a conductive layer is introduced on the top of a substrate and dielectric films providing an electrical or electrooptical function are provided in upper and lower parts of the conductive layer.

In this case, a film included in electrodes provided in the upper and lower parts of a liquid crystal and including functional film layers such as a photoalignment film, a gap spacer, and the like is manufactured by an R2R-based continuous process in the related art. A wiring process of the upper and lower electrodes is as important as processes such as electrical short-circuit and cutting in a step of processing a transparent conductive layer film substrate manufactured as such and including a coating layer having optical functionality according to purposes of the products.

In this case, there is a demand for a technique for selectively removing an optical functional layer such as an alignment film on the top without lowering electrical conductivity due to physical damage of a conductive layer (a transparent electrode, indium tin oxide, etc.) formed on the substrate. For example, a liquid crystal alignment layer such as reactive mesogen is coated over the entire conductive film substrate in a UV curing scheme and in this case, a wire portion cannot be removed by using a solvent or other wet method. Therefore, patterning processes including photolithography, inkjet, slot die, screen printing, and the like are required in the mesogen coating step and then an over-lay aligning process is required in a subsequent process.

Meanwhile, the patterning process described above is troublesome in that overlay accuracy of upper layers such as the conductive layer and the liquid crystal alignment layer on the substrate needs to be ensured in the process and has a disadvantage that cost of a facility increases in an increase in size.

PRIOR ART DOCUMENT

[Patent Document]
Korean Patent Registration No. 10-0297141

DETAILED DESCRIPTION OF THE INVENTION

Technical Problem

The present invention has been made in an effort to provide a method for forming a wire portion of a liquid crystal chromic device and a liquid crystal chromic device.

However, the object to be solved by the present invention is not limited to the aforementioned object and other objects, which are not mentioned above, will be apparent to a person having ordinary skill in the art from the following description.

Technical Solution

An embodiment of the present invention provides a method for forming a wire portion of a liquid crystal chromic device, which includes: a) preparing a liquid crystal chromic device including a substrate, a transparent electrode formed on the substrate, and an alignment film formed on the transparent electrode; b) forming two or more etching lines spaced apart by a constant interval by irradiating laser onto the alignment layer; and c) applying a conductive paste to a valley region of each of the etching lines.

An embodiment of the present invention provides a liquid crystal chromic device with the wire portion according to the method.

An embodiment of the present invention provides a liquid crystal chromic device including a substrate; a transparent electrode provided on the substrate; and an alignment film provided on the transparent electrode, in which the liquid crystal chromic device includes at least two etching lines spaced apart from each other at a constant interval on the alignment film, and a conductive paste in a valley region of each of the etching lines.

Advantageous Effects

A method of forming a wire portion of a liquid crystal chromic device according to an embodiment of the present invention has an advantage that conductivity of a damaged transparent electrode can be recovered even by a relatively simple method.

Since the method of forming a wire portion of a liquid crystal chromic device according to the embodiment of the present invention can be performed according to a roll-to-roll continuous process, productivity can be improved.

In the method of forming a wire portion of a liquid crystal chromic device according to the embodiment of the present invention, since a masking step or a patterning step can be omitted in advance and an appropriate wire portion can be formed according to a size of a product in a postprocess, a liquid crystal chromic device manufacturing process is simplified.

In the method of forming a wire portion of a liquid crystal chromic device according to the embodiment of the present invention, the wire portion can be formed with high reliability while using a low-cost laser facility.

BRIEF DESCRIPTION OF DRAWINGS

FIG. 1 is a schematic view illustrating a manufacturing process of a liquid crystal chromic device.

FIG. 2 is a schematic view of a lower film used in the manufacturing process of a liquid crystal chromic device.

FIG. 3 is a schematic view illustrating a method for forming a wire portion of a liquid crystal chromic device in the related art.

FIG. 4 is a schematic view of a method for forming a wire portion of a liquid crystal chromic device according to an embodiment of the present invention.

FIG. 5 is a photograph of an etching result according to Examples 1 to 10.

FIG. 6 is a photograph of a conductive paste coating result according to Examples 1 to 10.

FIG. 7a is an enlarged photograph of the etching result according to Example 1.

FIG. 7b is an enlarged photograph of the etching result according to Example 2.

FIG. 7c is an enlarged photograph of the etching result according to Example 3.

FIG. 7d is an enlarged photograph of the etching result according to Example 4.

FIG. 7e is an enlarged photograph of the etching result according to Example 5.

FIG. 7f is an enlarged photograph of the etching result according to Example 6.

FIG. 7g is an enlarged photograph of the etching result according to Example 7.

FIG. 7h is an enlarged photograph of the etching result according to Example 8.

FIG. 7i is an enlarged photograph of the etching result according to Example 9.

FIG. 7j is an enlarged photograph of the etching result according to Example 10.

FIGS. 8a and 8b are photographs of a state immediately after etching according to Example 3.

FIGS. 9a and 9b are photographs of states of applying and drying the conductive paste according to Example 3.

FIGS. 10a to 10d illustrate the etching result according to Comparative Example 1.

FIG. 11a illustrates a diagram used for laser etching for each laser irradiation interval according to Examples 11 to 19.

FIG. 11b is a photograph of a state in which a sample after etching is inserted between orthogonal polarizers according to Examples 11 to 19.

FIG. 12a illustrates a diagram of a screen printing mask used in application of silver paste in Examples 11 to 19.

FIG. 12b is a photograph of a state after the silver paste is applied to the sample after etching by using a screen printing mask and dried according to Examples 11 to 19.

FIG. 13 is a graph of temperature and humidity conditions at the time of a climate change test.

FIG. 14 is a photograph illustrating a state of the sample after an evaluation of the climate change test according to Examples 11 to 19.

FIG. 15 is a schematic view of a method for measuring two point probing in Examples 1 to 10.

FIG. 16a is a bar graph of the 2-point probing before and after the evaluation of the climate change test of Examples 11 to 19 in the case where a laser output is 25% of average power.

FIG. 16b is a bar graph of the 2-point probing before and after the evaluation of the climate change test of Examples 11 to 19 in the case where the laser output is 30% of the average power.

FIG. 16c is a bar graph of the 2-point probing before and after the evaluation of the climate change test of Examples 11 to 19 in the case where the laser output is 35% of the average power.

FIG. 16d is a bar graph of the 2-point probing before and after the evaluation of the climate change test of Examples 11 to 19 in the case where the laser output is 40% of the average power.

FIG. 17 is a photograph illustrating an evaluation result of an adhesive strength after the climate change test of the conductive paste used in Examples 11 to 19.

FIG. 18 is a schematic view illustrating a method for measuring the 2-point probing of the liquid crystal chromic device according to Examples 11 to 19.

BEST MODE

In the specification, it will be understood that when a member is referred to as being "on" another member, it can be directly on the other member or intervening members may also be present.

In the specification, unless explicitly described to the contrary, a case where any part "includes" any component will be understood to imply the inclusion of stated components but not the exclusion of any other component.

In the specification, the term of a degree used, "step (of~)" or "step of~" does not mean "step for".

In the specification, "A and/or B" means "A and B, or A or B".

In implementation of a thin film transparent electrode for forming an electrical wire of a large-area liquid crystal cell type film element (optical variable film—automobile sunroof, head mount display) based on a roll-to-roll (R2R) continuous process, when a liquid crystal alignment film (for example, a photoalignment film such as a reactive mesogen, or the like or a polyimide-based rubbing culture film, etc.) is coated, an optical functional thin film for alignment of liquid crystals needs to be selectively removed without damage to a lower electrode by a postprocess without a separate printing process and an overlay alignment.

Meanwhile, since the liquid crystal alignment film is made of UV or thermosetting for securing reliability of an element, wet removal using an organic solvent is not possible, so that the liquid crystal alignment film is desirably removed by dry etching.

Therefore, laser ablation using a laser has been considered in the dry removal of the liquid crystal alignment film. However, in this case, it is difficult to ensure a wire portion region by removing a polymer film for liquid crystal alignment having a thickness of several micrometers provided on a transparent electrode having a thickness of 40 nm or less without damaging the transparent electrode (without lowering the conductivity or a short-circuit).

Further, a vacuum-based plasma dry etching process may easily and selectively remove a liquid crystal alignment polymer film without damaging a lower conductive oxide film by using etching gas such as oxygen, but semiconductor-based vacuum equipment is expensive and it is difficult to apply the vacuum-based plasma dry etching process to a manufacturing process of a large-area liquid crystal chromic device, which is limited to a substrate on a wafer having a size of 4 to 12 inches. Furthermore, in the vacuum-based plasma dry etching process, when a plasma density is increased in order to improve a processability speed, deformation of a plastic substrate film due to heat may be induced and equipment manufactured for such a process is expensive.

In order to solve the problems, in the related art, has been introduced a method for selectively removing a reactive mesogen-based alignment film on the transparent electrode by irradiating an expensive ultrashort pico second pulse laser capable of minimizing thermal damage.

However, such a method is very sensitive to the uniformity of the transparent electrode and/or the flatness of the substrate film. Specifically, a thickness of the transparent electrode that may be applied to a flexible electronic device is formed to be very thin, from 30 nm to 70 nm, in order to ensure flexibility of the flexible electronic device. Furthermore, when the thickness of the liquid crystal alignment film to be removed is larger than that of the transparent electrode, it is difficult to selectively remove the liquid crystal alignment layer and process repeatability and process reliability are very poor, such that it is difficult to ensure processability.

In order to solve the above problems, the present inventors have developed a process for forming a wire portion of the liquid crystal chromic device, which minimizes damage to the transparent electrode while using an existing low-price processing IR laser. Specifically, according to a method for forming a wire portion of a liquid crystal chromic device according to an embodiment of the present invention, etching lines are formed at a constant interval on the alignment film, and the conductive paste is applied to an etching line region to completely restore electrical conductivity of the damaged transparent electrode and reliably ensure the wire portion region of the liquid crystal chromic device.

The present invention relates to a method for forming a wire portion of a liquid crystal chromic device described below. According to the method for forming a wire portion of a liquid crystal chromic device provided in the present invention, the wire portion may be formed and the damage to the substrate may be minimized through a simple process using a laser in the related art, thereby satisfying both the improvement of the process speed and the ensuring of product quality.

Hereinafter, the specification will be described in more detail.

According to an embodiment of the present invention, there is provided a method for forming a wire portion of a liquid crystal chromic device, which includes: a) preparing a liquid crystal chromic device including a substrate, a transparent electrode formed on the substrate, and an alignment film formed on the transparent electrode; b) forming two or more etching lines spaced apart by a constant interval by irradiating a laser onto the alignment film; and c) applying a conductive paste to a valley region of each of the etching lines.

First, a manufacturing process of the liquid crystal chromic device will be described with reference to FIG. 1. Referring to FIG. 1, when the liquid crystal chromic device is laminated with upper and lower films, a sealant is applied to etching line regions (short-circuit regions) of the alignment film and the transparent electrode with the etching lines of the upper and lower films through nozzle dispensing and liquid crystals (LC) are applied to a region to which the sealant is not applied. Then, the upper and lower films are vacuum-bonded to each other and thereafter, the sealant is cured by ultraviolet ray irradiation to manufacture the liquid crystal chromic device.

In this case, in order to form an electric cable wire portion, the remaining non-conductive region (for example, the alignment film) other than the transparent electrode needs to be removed from an electric cable wire portion region. In this case, when a single alignment film is formed like the upper film of FIG. 1, a wet etching process removing the single alignment film by a solvent such as toluene, isopropyl alcohol (IPA), or the like may be applied. However, when the liquid crystal chromic device further includes the alignment film and a liquid crystal alignment film provided on the alignment film like the lower film, a thickness of a liquid crystal alignment film is approximately 1 μm, and the liquid crystal alignment film is crosslinked by ultraviolet rays (UV), it is difficult to selectively remove the liquid crystal alignment film and the alignment film.

FIG. 2 is a schematic view of the lower film used in the manufacturing process of the liquid crystal chromic device. As illustrated in FIG. 2, in a laminating process of the liquid crystal chromic device, the lower film may include the alignment film provided on the transparent electrode and the liquid crystal alignment film provided on the alignment film and including a reactive mesogen. Meanwhile, a process of selectively removing the transparent electrode, the alignment film, and the liquid crystal alignment film by irradiating the laser to the liquid crystal chromic device such as the lower film may be accompanied by an ablation mechanism of a material by optical degradation of a material configuring each layer and a delamination mechanism caused by a difference in thermal expansion coefficient by light absorption between the transparent electrode and the substrate depending on the laser irradiation. Therefore, when a laser source of a long wavelength such as an infrared (IR, 1064 nm wavelength) laser or a fiber laser is used, the alignment film is formed on the transparent electrode, and the liquid crystal alignment film is further provided on the alignment film, and it is difficult to selectively remove the alignment film from the lower film in which the thickness of the liquid crystal alignment film is much larger than the thickness of the transparent electrode.

Further, in the case of selectively removing the alignment film formed on the transparent electrode and the liquid crystal alignment film formed on the alignment film, depending on a degree of light absorption of the substrate, the transparent electrode, the alignment film, and the liquid crystal alignment film relative to the laser wavelength, a degree of difficulty of the process may be determined. Therefore, laser wavelengths having a high light absorptance in the substrate, and the alignment film and/or the liquid crystal alignment film relative to the transparent electrode have been irradiated. However, since the substrate, the transparent electrode, the alignment film, and the liquid crystal alignment film have a similar light absorptance at most of the commercially available laser wavelengths for processing, it is difficult to select an efficient laser light source for selectively removing the alignment film and/or the liquid crystal alignment film. Meanwhile, since the thickness of the liquid crystal alignment film including the reactive mesogen is 13 to 25 times or more the thickness of the transparent electrode, it is not impossible to selectively etch a plurality of alignment films through a top-down scheme process using the laser.

For example, a method for selectively removing the liquid crystal alignment film using a ultrashort ultraviolet laser having a pulse width of 10 picoseconds ($10 \times 10^{-12}$ seconds) or less in order to minimize an influence of an optical degradation reaction due to absorption of the laser which is a process very sensitive to a laser focus distance may have a problem in yield.

FIG. 3 is a schematic view illustrating a method for forming a wire portion of a liquid crystal chromic device in the related art. Referring to FIG. 3, it can be seen that when a ultrashort ultraviolet laser 100 is irradiated to the liquid crystal chromic device including a substrate 10, a transparent electrode 20, an alignment film 30, and a liquid crystal alignment film 40 sequentially in the related art, it can be seen that one region of the transparent electrode, the alignment film, and the liquid crystal alignment film may be selectively removed.

However, in such a method, that is, a method for irradiating the ultrashort laser, when a dimension and flatness of the substrate are changed minutely or when a small vibration phenomenon occurs in a continuous process, the transparent electrode of the lower film may be damaged, and as a result, a process condition is very sensitive and the method is not suitable for a process large area mass production process. In addition, such a ultrashort laser has a problem that a price and operation cost of a source are expensive.

Thus, the present inventors have invented a method for forming a wire portion of a liquid crystal chromic device, which may minimize the damage of the transparent electrode and compensate deterioration of conductivity due to the damage of the transparent electrode while using an IR laser or fiber laser source used in the related art. Specifically, according to one embodiment of the present invention, it is possible to secure a process factor for a laser output capable of minimizing the damage to the transparent electrode while using an infrared laser or a fiber laser source which is a general laser source for processing and selectively remove a plurality of alignment films including a reactive mesogen. In this case, the damage of the transparent electrode may inevitably occur due to a dimensional change and a difference in flatness of the film. However, according to one embodiment of the present invention, when the conductive paste is applied to the etching line region in which the alignment film is selectively removed, it is confirmed that the deterioration of the conductivity due to the inevitable damage of the transparent electrode may be compensated and the present invention has been made.

FIG. 4 is a schematic view of a method for forming a wire portion of a liquid crystal chromic device according to an embodiment of the present invention.

Referring to FIG. 4, in the method for forming a wire portion of a liquid crystal chromic device according to the embodiment of the present invention, two or more etching lines spaced apart by a constant interval may be formed by irradiating a laser to the liquid crystal chromic device including a substrate 10, a transparent electrode 20 formed on the substrate, an alignment film 30 formed on the transparent electrode, and a liquid crystal alignment film 40 formed on the alignment film, a conductive paste 50 may be applied to a valley region of each of the etching lines, and then, the conductive paste may be dried. Further, in this case, a short-circuited transparent electrode region is electrically connected in a damaged part of the transparent electrode to compensate deterioration of conductivity due to the damage to the transparent electrode.

According to an embodiment of the present invention, the method for forming a wire portion of a liquid crystal chromic device includes a step (step a)) of preparing the liquid crystal chromic device including the substrate, the transparent electrode formed on the substrate, and the alignment film formed on the transparent electrode.

According to one embodiment of the present invention, the liquid crystal chromic device may include the substrate at a lowermost part. In addition, the substrate may be a transparent polymer substrate and specifically, the substrate may be a light transmissive board that transmits light.

In the specification, the term "transparent" may mean that light transmittance at a wavelength of 550 nm is 70% or more or 80% or more.

Furthermore, the transparent polymer substrate may be a transparent polymer film such as a polycarbonate (PC) film, a colorless polyimide film, a polyethylene terephthalate (PET) film, or a cycloolefin polymer (COP) film, but is not necessarily limited thereto.

According to an embodiment of the present invention, the thickness of the substrate may be 50 μm or more and 200 μm or less, specifically 70 μm or more and 200 μm or less, 50 μm or more and 150 μm or less, or 70 μm or more and 150 μm or less, and more specifically, 90 μm or more and 150 μm or less, 70 μm or more and 110 μm or less, or 90 μm or more and 110 μm or less. However, the present invention is not limited thereto, and the condition of the laser irradiated according to the thickness of the substrate may be appropriately adjusted.

According to an embodiment of the present invention, the liquid crystal chromic device may include the transparent electrode formed on the substrate.

According to an embodiment of the present invention, the transparent electrode may include a conductive oxide. Further, the conductive oxide may include at least one of ZnO, Al-doped ZnO, Ga-doped ZnO, $SnO_2$, $In_2O_3$, and indium tin oxide (ITO), but is not necessarily limited thereto.

In addition, the transparent electrode may be a conductive oxide layer and specifically, the transparent electrode may be an indium tin oxide (ITO) layer.

According to an embodiment of the present invention, the thickness of the transparent electrode may be 20 nm or more and 100 nm or less, specifically 30 nm or more and 100 nm or less, 20 nm or more and 80 nm or less, or 30 nm or more and 80 μm or less, and more specifically, 40 nm or more and 80 nm or less, 30 nm or more and 70 nm or less, or 40 nm or more and 70 nm or less.

That is, since the thickness of the transparent electrode is relatively thin as in the above range, the transparent electrode may be easily damaged in the process of selectively removing a part of the alignment film and the transparent electrode damaged as such may then cause the deterioration of electrical conductivity of the liquid crystal chromic device.

Meanwhile, according to an embodiment of the present invention, the method for forming a wire portion of a liquid crystal chromic device may minimize the damage of the transparent electrode having a small thickness as in the above range and according to the method for forming a wire portion of a liquid crystal chromic device, the deterioration of the conductivity due to the inevitable damage to the transparent electrode may be compensated.

According to an embodiment of the present invention, the liquid crystal chromic device may include the alignment film formed on the transparent electrode.

According to an embodiment of the present invention, the alignment film may include a photoalignment compound. Further, the photoalignment compound may mean a compound that is orientationally ordered in a predetermined direction through a rubbing process or light irradiation and induces alignment of liquid crystal molecules to a predetermined direction through an intermolecular interaction with an adjacent liquid crystal compound in the aligned state to impart an optical anisotropic interaction. Further, the light alignment compound may exist in the aligned state so as to be oriented in the alignment film.

According to an embodiment of the present invention, the alignment film may include at least one light alignment compound selected from a monomolecular compound, a monomeric compound, an oligomeric compound, and a polymeric compound, but is not necessarily limited thereto.

According to an embodiment of the present invention, the liquid crystal chromic device may further include the liquid crystal alignment film formed on the alignment film. In addition, the liquid crystal alignment film may include the reactive mesogen.

According to an embodiment of the present invention, the reactive mesogen as a material commonly used in the art may mean a mesogen including a reactor capable of inducing polymerization by light or heat. In addition, the term "mesogen" may refer to a meso phase compound which may, when liquid crystal compounds are polymerized to form a layer, allow the layer to show a behavior of the liquid crystal phase.

According to an embodiment of the present invention, the method for forming a wire portion of a liquid crystal chromic device includes a step (step b)) of forming two or more etching lines spaced by a constant interval by irradiating the laser onto the alignment film. That is, the etching lines at a constant interval formed in the alignment film may be formed in accordance with the laser irradiation.

According to an embodiment of the present invention, the laser may be irradiated in the direction from the alignment film to the transparent electrode. Further, a focal point at which the laser is irradiated is not necessarily limited and may be appropriately adjusted according to the thickness of each layer included in the liquid crystal chromic device and a position of a member to be etched.

According to an embodiment of the present invention, a laser light source of the laser may be arbitrarily selected from those known in the art, as long as the laser light sources may etch an organic polymer layer in an optical degradation reaction.

When the output of the laser to be irradiated is low and a pulse width is long, ablation of the alignment film by the laser absorbed on an upper surface of the alignment film may be induced and when the output of the laser to be irradiated is high and the pulse width is short, the transparent electrode may be delaminated from the substrate due to instantaneous volume expansion due to absorption of laser light by the transparent electrode.

According to an embodiment of the present invention, the laser may be a laser for processing, laser with a wavelength of 1064 nm, an infra-red (IR) laser or fiber laser. It is preferable that irradiating the laser with the low laser output and the long pulse width according to the embodiment of the present invention may be more advantageous than irradiating the laser with the high output and the short pulse width in the selective removal of the alignment film or the alignment film and the transparent electrode provided on the alignment film.

According to an embodiment of the present invention, a repetition rate of the laser may be 20 kHz to 200 kHz. Meanwhile, the repetition rate of the laser is not limited to the above range and may be appropriately adjusted according to a type, the thickness, and the like of the member constituting the liquid crystal chromic device to which the laser is irradiated.

According to an embodiment of the present invention, an average output of the laser may be 10 W or more and 100 W or less, specifically 30 W or more and 80 W or less, and more specifically 40 W or more and 60 W or less.

Further, according to an embodiment of the present invention, an output ratio of the laser may be 20% or more and 70% or less and specifically 25% or more and 45% or less with respect to the output of the average output of the laser. The transparent electrode and the alignment film may be delaminated from the substrate due to a difference in thermal expansion coefficient between the transparent electrode and the substrate within the range of the average output of the laser and the output ratio thereof.

Meanwhile, the average output and the output ratio of the laser are not limited to the above ranges and may be appropriately adjusted according to the type, the thickness, and the like of the member constituting the liquid crystal chromic device to which the laser is irradiated.

According to an embodiment of the present invention, the laser may be irradiated so that a interval between the etching lines is 30 μm or more and 450 μm or less and specifically 40 μm or more and 450 μm or less. Further, the etching line may be formed simultaneously with the laser irradiation. Therefore, the irradiation interval of the laser and the interval between the adjacent etching lines may be equal to each other. That is, according to an embodiment of the present invention, the irradiation interval of the laser may be 30 μm or more and 450 μm or less and specifically 40 μm or more and 450 μm or less.

A beam size of the laser irradiated to the liquid crystal chromic device may be 20 μm or more and 40 μm or less and specifically approximately 35 μm.

Only when the laser is irradiated so that the interval between the etching lines is in the above range, it is possible to ensure an overlapping degree of the laser beam in a proper range and prevent excessive irradiation of the laser, thereby minimizing the damage to the transparent electrode.

In addition, it is possible to reduce a processing time by irradiating the laser so that the interval of the etching lines is in the above range and the liquid crystal chromic device with the wire portion may maintain electrical conductivity of a constant level even under a condition of a high temperature and a high humidity.

In the method for forming a wire portion of a liquid crystal chromic device according to an embodiment of the present invention, the alignment film and the transparent electrode are etched and short-circuited by irradiating a low-price processing laser such as the IR laser or a pulse laser and thereafter, the conductive paste is applied to the valley region of each of the etching lines which is a short-circuited region to solve a problem depending on the short-circuit of the transparent electrode. The short-circuited electrical conductivity is restored by applying the conductive paste as described above to allow a wiring process using an anisotropic conductive film (ACF) to be then smoothly performed.

Meanwhile, when the etching line penetrates the electrode film and the substrate is thus exposed, the electrical conductivity restoration of the short-circuited transparent electrode may not be sufficient even when the conductive paste is applied to the valley region of each of the etching lines which is a short-circuited region.

Thus, in the method for forming a wire portion of a liquid crystal chromic device according to an embodiment of the present invention, the damage to the transparent electrode may be minimized by adjusting the output and irradiation interval of the irradiated laser to the above-described range.

In the specification, the term "etching line" may mean that etched grooves are continuously connected as the laser is irradiated onto a member.

In the specification, the term "interval between etching lines" may mean the distance between adjacent etching lines.

According to an embodiment of the present invention, the etching line may be formed to penetrate the alignment film. In this case, one region of the transparent electrode may be exposed according to the laser irradiation. Further, when the etching line penetrates through the alignment film, the etching line may be at least a part of the transparent electrode which is etched.

According to an embodiment of the present invention, depending on the laser irradiation conditions, the etching line may penetrate both the alignment film and the transparent electrode and in this case, one region of the substrate is damaged and is thus locally electrically short-circuited to be exposed or one region of the substrate may be exposed in an undamaged state.

Furthermore, when the liquid crystal chromic device further includes the liquid crystal alignment film formed on the alignment film, the laser may be irradiated onto the liquid crystal alignment film.

In this case, the etching line may be formed on the liquid crystal alignment film. Further, the etching line may penetrate the liquid crystal alignment film and the alignment film so that at least a part of the transparent electrode which is etched.

According to an embodiment of the present invention, in step b) of the present invention, when the etching line is formed by irradiating the laser to the liquid crystal chromic device, a part of the transparent electrode may be etched together with the alignment film. The transparent electrode damaged by the etching may be electrically connected through the conductive paste application described below and the short-circuited transparent electrode region may be thus electrically connected.

According to an embodiment of the present invention, the method for forming a wire portion of the liquid crystal chromic device includes a step (step c)) of applying the conductive paste to the valley region of each of the etching lines. By applying the conductive paste to the valley region of each of the etching lines, a decrease in the electrical conductivity of the liquid crystal chromic device including the transparent electrode damaged as the etching line is formed as described above may be compensated.

Specifically, the conductive paste is applied to the etched region of the transparent electrode, thereby preventing the transparent electrode region from being short-circuited.

According to an embodiment of the present invention, the valley region of each of the etching lines may refer to a region etched by the etching line. By applying the conductive paste to the valley region of each of the etching lines, the transparent electrode short-circuited by the laser irradiation may be electrically connected.

In addition, as the conductive paste fills a concave portion of the etching line and is overcoated to a height greater than the height of the region (convex portion) where the etching line is not formed, the conductive paste may be used as a physical buffer layer which makes the liquid crystal chromic device according to an embodiment of the present invention be easily wire-connected when liquid crystal chromic device according to an embodiment of the present invention is electrically connected to the outside. Specifically, when the physical buffer layer is electrically connected to the outside, the physical buffer layer may be easier to be wire-connected than the transparent electrode.

According to an embodiment of the present invention, in the present invention, the conductive paste may include at least one of silver (Ag) paste, Cu paste, Ni paste, carbon paste, and aluminum (Al) paste and may specifically include the silver paste.

According to an embodiment of the present invention, the conductive paste may be applied using a brush, a roller, or the like according to a solid fraction and viscosity thereof or may be applied by a nozzle dispensing method.

According to an embodiment of the present invention, the method for forming a wire portion of a liquid crystal chromic device may include a step of heat-treating the liquid crystal chromic device to which the conductive paste is applied. The conductive paste applied through the heat treatment is dried to serve as the wire portion of the liquid crystal chromic device.

Further, the heat treatment method is not particularly limited and a known heat treatment method may be used. Furthermore, conditions of the heat treatment are not particularly limited as long as the conditions of the heat treatment may be adjusted to such an extent that the conductive paste may be dried without damaging the layers constituting the liquid crystal chromic device.

According to an embodiment of the present invention, the method for forming a wire portion of a liquid crystal chromic device may be performed by a roll-to-roll continuous process. That is, in the method for forming a wire portion of a liquid crystal chromic device, the liquid crystal chromic device is made to be large-sized even by a relatively simple method and the liquid crystal chromic device may be continuously manufactured.

According to an embodiment of the present invention, in the method for forming a wire portion of a liquid crystal chromic device, since the large-sized liquid crystal chromic device may be applied to the continuous process, the method for forming a wire portion of a liquid crystal chromic device may be applied to manufacturing of a film for an automobile sunroof, for a smart window, for a privacy window, or for transmission variation.

An embodiment of the present invention provides the liquid crystal chromic device with the wire portion according to the method.

An embodiment of the present invention provides a liquid crystal chromic device including a substrate; a transparent electrode provided on the substrate; and an alignment film provided on the transparent electrode, in which the liquid crystal chromic device includes at least two etching lines spaced apart from each other at a constant interval on the alignment film, and a conductive paste in a valley region of each of the etching lines.

According to an embodiment of the present invention, the description of the substrate, the transparent electrode, the alignment film, and the conductive paste may be the same as that described above.

Further, according to an embodiment of the present invention, the etching line may be formed to penetrate the alignment film as described above. Furthermore, in this case, at least a part of the transparent electrode is etched.

According to an embodiment of the present invention, the conductive paste may be filled in the valley region of each of the etching lines. Further, according to an embodiment of the present invention, the liquid crystal chromic device may include a dried material of the conductive paste in the valley region of each of the etching lines. That is, the liquid crystal chromic device may include the dried material of the conductive paste and the dried material of the conductive paste may be filled in the valley region of each of the etching lines.

According to an embodiment of the present invention, the liquid crystal chromic device may further include the liquid crystal alignment film formed on the alignment film. In addition, the description of the liquid crystal alignment film may be the same as that described above.

According to an embodiment of the present invention, the interval between the etching lines adjacent to each other may be 30 μm or more and 450 μm or less and specifically 40 μm or more and 450 μm or less.

Since the transparent electrode has a small thickness as described above, when the laser irradiation condition is not appropriately controlled, the transparent electrode is seriously damaged, resulting in a problem in that the electrical short circuit is deepened. Further, in this case, even if the conductive paste is provided in the valley region of each of the etching lines, a problem may arise that an electrical conduction pathway in a thickness direction of the transparent electrode is not sufficiently formed.

Therefore, when the interval between the etching lines is adjusted within the above range, excessive damage of the transparent electrode may be prevented, and further, the electrical conductivity of the transparent electrode may be easily recovered by using the conductive paste.

In addition, the conductive paste may be over-coated on the etching line of the liquid crystal chromic device to form the physical buffer layer, and as a result, the electrical conductivity may be easily ensured when a flexible printed circuit board (FPCB) is then bonded using the ACF film.

Hereinafter, the present invention will be described in more detail on the basis of examples, but the embodiments of the present invention described below are illustrative only and the scope of the present invention is not limited to these embodiments. The scope of the present invention be indicated by the appended claims and may include all changes that come within the meaning and range equivalent to the claims.

Examples 1 to 10

A COP substrate having a thickness of about 40 μm, a transparent electrode including ITO having a thickness of about 40 nm, an alignment film having a thickness of about 80 nm including a photo-alignment compound (LG CHEM) based on a norbornene resin including a cinnamate functional group, and a liquid crystal alignment film having a thickness of about 1 μm including a reactive mesogen (RMM141C, MERCK) are sequentially provided to prepare a liquid crystal chromic device (1,000 mm×500 mm).

A fiber laser (G4, SPI, F-theta lens scanner) having an average output of about 50 W and a wavelength of 1064 nm was irradiated onto the liquid crystal chromic device at a repetition rate of 100 kHz, an output ratio of 45% and an irradiation speed of 2 m/s and irradiated in areas having a size of 10 mm×10 mm (width×length) on the liquid crystal alignment film by adjusting an irradiation interval as shown in Table 1 below, respectively, to form etching lines in the liquid crystal chromic device according to Examples 1 to 10.

FIG. 5 is a photograph of an etching result according to Examples 1 to 10. Particularly, FIG. 5 is a photograph obtained by inserting and photographing the liquid crystal chromic device between orthogonal polarizers after forming the etching lines according to Examples 1 to 10.

Referring to FIG. 5, since the specific gravity of the laser irradiated to the alignment film portion is increased as the irradiation interval of the laser is decreased, in the case of confirming light inserted and transmitted between the orthogonal polarizers, it may be confirmed that the light has a low transmittance due to a change in phase difference caused by removing the liquid crystal alignment film, and thus, the light is relatively dark.

Thereafter, silver paste (MicroPE® PG007-AP manufactured by Faru, Co., Ltd.) was coated to the liquid crystal chromic device to which the laser was irradiated using a roller, and then dried in an oven at a temperature of about 120° C. for about 10 minutes.

FIG. 6 is a photograph obtained by inserting and photographing the liquid crystal chromic device coated with the silver paste between the orthogonal polarizers according to Examples 1 to 10.

Examples 11 to 19

As Examples for a liquid crystal chromic device for a sunroof, a COP substrate having a thickness of about 40 μm, a transparent electrode including ITO having a thickness of about 40 nm, an alignment film having a thickness of about 100 nm including a photo-alignment compound (LG CHEM) based on a norbornene resin including a cinnamate functional group, and a liquid crystal alignment film having a thickness of about 1.2 including a reactive mesogen (RMM141C, MERCK) are sequentially provided to prepare a liquid crystal chromic device.

In the liquid crystal chromic device, a Galvano Scanner based infrared laser with an average output of about 50 W and a wavelength of 1064 nm was irradiated on the liquid crystal alignment film with respect to a laser irradiation area of 80 mm×5 mm (width×length) at a repetition rate of 100 kHz and an irradiation speed of 2.5 m/s by adjusting the irradiation interval as shown in Table 2 below to form etching lines in the liquid crystal chromic device.

TABLE 1

| Classification | Example 1 | Example 2 | Example 3 | Example 4 | Example 5 | Example 6 | Example 7 | Example 8 | Example 9 | Example 10 |
|---|---|---|---|---|---|---|---|---|---|---|
| Irradiation interval (μm) | 40 | 50 | 60 | 70 | 80 | 90 | 100 | 110 | 120 | 130 |

TABLE 2

| Classification | Example 11 | Example 12 | Example 13 | Example 14 | Example 15 | Example 16 | Example 17 | Example 18 | Example 19 |
|---|---|---|---|---|---|---|---|---|---|
| Irradiation interval (μm) | 40 | 100 | 150 | 200 | 250 | 300 | 350 | 400 | 450 |

FIG. 11a illustrates a diagram used for laser etching for each irradiation interval according to Examples 11 to 19. Referring to FIG. 11a, sizes of samples of Examples 11 to 19 were 80 mm×5 mm (width×length) and the samples were arranged from the top to the bottom in sequence.

FIG. 11b illustrates a photograph obtained by adjusting an output ratio to 40% of an average output and inserting and photographing liquid crystal chromic device samples formed with etching lines between orthogonal polarizers according to Examples 11 to 19.

Referring to FIG. 11b, it was found that the sample according to Example 11 in which the irradiation interval was smallest as expected in FIG. 11a had a high specific gravity of the laser irradiated on the alignment film portion. Therefore, when the sample according to Example 11 is inserted between orthogonal polarizers to confirm the transmitted light, it may be confirmed that the light has a low transmittance due to a change in phase difference caused by removing the alignment film, and thus, the light is relatively dark.

In order to coat a conductive paste on a plate on which samples of the liquid crystal chromic device irradiated with the laser according to Examples 11 to 19 are arranged, a screen printing mask was provided on the plate arranged with the samples of the liquid crystal chromic device.

FIG. 12a illustrates a diagram of a screen printing mask used when the silver paste is coated. Referring to FIG. 12a, the screen printing mask is opened with a size of 85.0 mm×7.0 mm (width×length).

Thereafter, silver paste (MicroPE® DPG007-AP, manufactured by Faru, Co., Ltd.) was coated on a plate provided with the screen mask using a roller and then dried in an oven at a temperature of about 120° C. for about 10 minutes to prepare a liquid crystal chromic device formed with a wiring portion.

FIG. 12B illustrates a photograph obtained by photographing an appearance of the liquid crystal chromic device dried in the oven by coating the conductive paste as such. Particularly, FIG. 12b illustrates a photograph obtained by photographing appearances of samples according to Examples 11 to 19 when output ratios during irradiation of the laser were uniformly maintained to 25%, 30%, 35% and 40% for the average output, respectively.

Comparative Example 1

A COP substrate having a thickness of about 40 μm, a transparent electrode including ITO having a thickness of about 40 nm, an alignment film having a thickness of about 100 nm including a photo-alignment compound (LG CHEM) based on a norbornene resin including a cinnamate functional group, and a liquid crystal alignment film having a thickness of about 1.2 including a reactive mesogen (RMM141C, MERCK) are sequentially provided to prepare a liquid crystal chromic device.

In the liquid crystal chromic device, a pico second ultrashort laser (TruMicro 5050) having an output of about 15 W, a wavelength of 343 nm, maximum pulse energy of 37.5 μJ, and a pulse width of 10 ps was irradiated in areas having a size of 20 mm×20 mm on the liquid crystal alignment film by adjusting output ratios to 13%, 14%, 15%, and 16% at a repetition rate of 200 kHz, an irradiation speed of 700 mm/s, and an irradiation interval of about 60 μm to form etching lines in the liquid crystal chromic device.

An etching result according to Comparative Example 1 is illustrated in FIGS. 10a to 10d. Referring to FIGS. 10a to 10d, in Comparative Example 1 using a ultrashort laser having a narrow pulse width, it can be seen that the alignment film may be selectively removed.

Meanwhile, referring to FIGS. 10a to 10d, a rapid increase in resistance value according to the damage of the transparent electrode can be shown and peeling from the substrate of the alignment film and/or the transparent electrode in a non-irradiation area of the laser was observed. Meanwhile, a method of measuring the resistance value will be described in more detail in the following Experimental Example 2. Therefore, it can be seen that in the case of using the ultrashort wave laser, it is difficult to form the etching lines at constant intervals.

[Experimental Example 1]—Confirmation of Appearance of Liquid Crystal Chromic Device Formed with Etching Lines FIGS. 7a and 7b are photographs obtained by enlarging and photographing etching results according to Examples 1 and 2, respectively; FIGS. 7c and 7d are photographs enlarging etching results according to Examples 3 and 4, respectively; FIGS. 7e and 7f are photographs enlarging etching results according to Examples 5 and 6, respectively; FIGS. 7g and 7h are photographs enlarging etching results according to Examples 7 and 8, respectively; and FIGS. 7i and 7j are photographs enlarging etching results according to Examples 9 and 10, respectively.

Particularly, FIGS. 7a to 7j are photographs obtained by enlarging and photographing the liquid crystal chromic device by using an optical microscope (Eclipse L300ND, Nikon) by inserting the liquid crystal chromic device into orthogonal polarizers after forming an etching line according to each of Examples 1 to 10, respectively.

According to FIGS. 7a to 7j, it can be seen that the transparent electrode is damaged while the alignment film is removed by irradiating the laser through a relatively bright area, and it can be seen that the alignment film remains and the transparent electrode is not damaged in the area to which the laser is not irradiated through a relatively dark area.

FIGS. 8a and 8b are photographs immediately after etching according to Example 3. Particularly, FIGS. 8a and 8b are photgraphs of the liquid crystal chromic device etched according to Example 3 using an optical microscope (Eclipse L300ND, Nikon) by inserting the liquid crystal chromic device etched according to Example 3 into the orthogonal polarizer. More particularly, FIG. 8a is a photograph taken in a reflection mode.

Further, FIG. 9a is a photograph after coating silver (Ag) paste after etching and FIG. 9b is a photograph after drying according to Example 3.

Referring to FIGS. 8a and 8b and FIGS. 9a and 9b, it can be seen that a damaged ITO area in which an ITO transparent electrode is damaged by irradiating a laser and an undamaged ITO area in which the laser is not irradiated, an alignment film R/M remains, and the transparent electrode is not damaged are distinguished from each other. Further, according to FIGS. 8a and 8b and FIGS. 9a and 9b, it can be seen that the silver (Ag) paste is coated in the area formed with the etching lines.

[Experimental Example 2]—Measurement of Change in Resistance Value Before and after Coating Conductive Paste In order to confirm a degree of damage of the ITO transparent electrode of the liquid crystal chromic device formed with the etching lines according to Examples 1 to 10 and whether or not to compensate for a damaged resistance value of the liquid crystal chromic device formed with the wiring portion, the resistance value of the liquid crystal chromic device was measured by 2-point probing and the results are shown in Table 3 below.

Meanwhile, since it is not easy to measure a surface resistance of a pattern area having various etching line intervals using a laser by four probes, the 2-point probing was measured in order to compare relative resistance values, not absolute values.

FIG. 15 is a schematic diagram illustrating a method of measuring 2-point probing in Examples 1 to 10. A left side of FIG. 15 illustrates a method for measuring 2-point probing of a liquid crystal chromic device formed with etching lines and a right side of FIG. 15 illustrates a method for measuring 2-point probing of a liquid crystal chromic device formed with a wiring portion.

As illustrated in FIG. 15, in order to measure the 2-point probing, the liquid crystal chromic device was prepared, in which a substrate, a transparent electrode, and an alignment film are formed in sequence so that the ITO transparent electrode is exposed in an area far away from about 50 mm from the center of the laser irradiation area. Furthermore, in order to secure an independent correlation of the laser process conditions for the alignment film, the transparent electrode in each of Examples 1 to 10 is individually short-circuited by irradiating with a laser of high intensity to be separated into independently and electrically isolated areas having a constant size.

Next, a laser under the same conditions as those in Examples 1 to 10 was irradiated to the sample side of the liquid crystal chromic device to form an etching line in an area of 10×10 mm$^2$, and like the left side of FIG. 15, the resistance (resistance immediately after etching) of the liquid crystal chromic device formed with the etching lines was measured ten times using general resistance test equipment (HiTester, Hioki Co., Ltd.) and an average value of the measured resistances is shown in Table 3 below.

Furthermore, silver paste was coated on the sample side of the liquid crystal chromic device formed with the etching lines, and after drying, resistance (resistance after Ag coating) of the area where the conductive paste was coated was measured 10 times using general resistance test equipment as shown on the right side of FIG. 15, and an average value of the measured resistances was shown in Table 3 below.

For reference, a reference resistance ($\Omega_{ref}$=200 to 300 Ω/sq) referred to in the resistance measurement refers to a resistance of the exposed ITO transparent electrode of the liquid crystal chromic device prepared so that the ITO transparent electrode is exposed.

TABLE 3

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Laser irradiation interval (μm) | 40 | 50 | 60 | 70 | 80 | 90 | 100 | 110 | 120 | 130 |
| Resistance immediately after etching (Ω/sq) | 800 | 1,200 | 1,300 | 1,700 | 2,600 | 750 | 580 | 600 | 1,500 | 2,400 |
| Resistance after Ag coating (Ω/sq) | 300 | 200 | 200 | 360 | 380 | 330 | 270 | 200 | 260 | 500 |

According to the resistance value immediately after etching shown in Table 3, it could be seen that the transparent electrode was damaged by the laser irradiation, and the resistance value of each sample was remarkably increased.

Further, according to the resistance value after Ag coating shown in Table 3, it could be seen that the decrease in the electrical conductivity of each sample caused by the damage of the transparent electrode by the laser irradiation was compensated by coating the Ag paste.

However, as shown in FIG. 10, it could be seen that the resistance value of the liquid crystal chromic device according to Comparative Example 1 measured in the same manner as the resistance cannot be measured because the alignment film is not removed up to the ITO transparent electrode when the output ratio is 13% (FIG. 10a) with respect to the irradiated laser output, and has a resistance value of 2,000 Ω/sq to 5,000 Ω/sq at 14% (FIG. 10b), a resistance value of 200 Ω/sq to 400 Ω/sq at 15% (FIG. 10c), and a resistance value of 500 Ω/sq to 700 Ω/sq at 16% (FIG. 10d).

That is, like FIG. 1, it could be seen that when a ultrashort laser is used, an output ratio thereof is controlled and the laser is irradiated, a large change in resistance value is caused even with a slight change in output, so that it is very difficult to remove the alignment film stably.

[Experimental Example 3]—Climate Change Test

A process in which the liquid crystal chromic device provided with the wire portion according to Examples 11 to 19 was heated to a temperature of about 90° C. from a temperature of −40° C. at a speed of about 1° C./min, maintained for 4 hours, and then lowered to about −40° C. from about 90° C. at a speed of about 1° C./min, and maintained for 4 hours was repeated ten times to perform a climate evaluation. A graph of temperature and humidity conditions at the time of such a climate change test is shown in FIG. 13.

FIG. 14 illustrates a photograph of an appearance after evaluating a climate change test of the liquid crystal chromic device provided with the wire portion according to Examples 11 to 19, particularly, a photograph of an appearance after adjusting output ratios of the laser during laser irradiation to 25%, 30%, 35% and 40% with respect to the average output, respectively, and evaluating a climate change test of the liquid crystal chromic device provided with the wiring portion. According to FIG. 14, it was confirmed that the weather resistance of the liquid crystal chromic device formed with the wire portion was sufficient even in a rapid thermal change.

[Experimental Example 4]—Evaluation of 2-Point Probing Before/after Climate Change Test In order to confirm whether compensation for the damaged resistance value of the liquid crystal chromic device formed with the wire portion according to Examples 11 to 19 is stably maintained before/after the climate change test, the resistance value of the liquid crystal chromic device is measured through 2-point probing and the results are shown in Table 4 (before the test) and Table 5 (after the test) below.

Meanwhile, since it is not easy to measure a surface resistance of a pattern area having various etching line intervals using laser irradiation by four probes, the 2-point probing was measured in order to compare relative resistance values, not absolute values.

FIG. 18 illustrates a schematic diagram illustrating a method of measuring 2-point probing of the liquid crystal chromic device formed with the wire portion according to Examples 11 to 19. A left side of FIG. 18 illustrates a liquid crystal chromic device formed with etching lines and a right side of FIG. 18 illustrates the liquid crystal chromic device formed with the wire portion and a method for measuring 2-point probing, respectively.

As illustrated in FIG. 18, in order to measure the 2-point probing, the liquid crystal chromic device was prepared, in which a substrate, a transparent electrode, and an alignment film are formed in sequence so that the ITO transparent electrode is exposed in an area far away from one end of the laser irradiation area by about 50 mm to prepare the liquid crystal chromic device. Furthermore, in order to secure an independent correlation of the laser process conditions for the alignment film, the transparent electrodes in areas of Examples 11 to 19 were individually short-circuited by irradiating with a laser of high intensity to be separated into independently and electrically isolated areas having a constant size.

Furthermore, a laser under the same conditions as those in Examples 11 to 19 was irradiated to the sample side of the liquid crystal chromic device to form etching lines in an area of 5×80 mm$^2$ (width×length) (left), silver paste was coated on the sample side of the liquid crystal chromic device formed with the etching lines, a resistance of the area coated with the conductive paste was measured ten times using a general resistance tester (HiTester, Hioki Co., Ltd.) after drying (right), and the average value of the measured resistances is shown in Table 3 below.

For reference, a reference resistance ($\Omega_{ref}$=200 to 300Ω) referred to in the resistance measurement refers to a resistance of the exposed ITO transparent electrode of the liquid crystal chromic device prepared so that the ITO transparent electrode is exposed.

The results of measuring 2-point probing before and after the climate test in Examples 11 to 19 measured above are shown in Tables 4 and 5 below. Specifically, the output ratios of the laser at the time of laser irradiation were adjusted to 25%, 30%, 35%, and 40%, respectively, with respect to the average output, and the results of measuring 2-point probing before (Table 4) and after (Table 5) the evaluation of the climate change test of the liquid crystal chromic device formed with the wire portion are shown in Tables 4 and 5 below.

TABLE 4

| | Example 11 | Example 12 | Example 13 | Example 14 | Example 15 | Example 16 | Example 17 | Example 18 | Example 19 |
|---|---|---|---|---|---|---|---|---|---|
| Laser irradiation interval (μm) | 40 | 100 | 150 | 200 | 250 | 300 | 350 | 400 | 450 |
| 25 (Power, %) | 215 | 215 | 225 | 225 | 235 | 235 | 270 | 410 | 300 |
| 30 (Power, %) | 160 | 160 | 160 | 165 | 165 | 170 | 185 | 185 | 450 |
| 35 (Power, %) | 150 | 170 | 130 | 130 | 130 | 130 | 130 | 135 | 140 |
| 40 (Power, %) | 125 | 125 | 125 | 130 | 130 | 130 | 130 | 130 | 140 |

* Unit: Ω

TABLE 5

| | Example 11 | Example 12 | Example 13 | Example 14 | Example 15 | Example 16 | Example 17 | Example 18 | Example 19 |
|---|---|---|---|---|---|---|---|---|---|
| Laser irradiation interval (μm) | 40 | 100 | 150 | 200 | 250 | 300 | 350 | 400 | 450 |
| 25 (Power, %) | 315 | 305 | 280 | 300 | 300 | 450 | 400 | 1,800 | 900 |
| 30 (Power, %) | 185 | 185 | 180 | 200 | 215 | 210 | 300 | 330 | 1,700 |
| 35 (Power, %) | 130 | 135 | 135 | 135 | 135 | 140 | 135 | 145 | 150 |
| 40 (Power, %) | 145 | 140 | 140 | 140 | 155 | 145 | 150 | 160 | 160 |

* Unit: Ω

Further, when the output ratio to the average output of the irradiated laser is constant, FIG. 16 illustrates a bar graph of 2-point probing measured before and after the climate change test of the liquid crystal chromic device formed with the wire portion according to Examples 11 to 19 in which the laser irradiation interval is adjusted.

Particularly, FIG. 16*a* is a bar graph of 2-point probing measured before and after the climate change test in Examples 11 to 19 when a laser output is 25% of an average output, FIG. 16*b* is a bar graph of 2-point probing measured before and after the climate change test in Examples 11 to 19 when a laser output is 30% of an average output, FIG. 16*c* is a bar graph of 2-point probing measured before and after the climate change test in Examples 11 to 19 when a laser output is 35% of an average output, and FIG. 16*d* is a bar graph of 2-point probing measured before and after the climate change test in Examples 11 to 19 when a laser output is 40% of an average output.

According to FIGS. 16*a* to 16*d*, except for Example 18 in which the output ratio is 25% of the average output and Example 19 in which the output ratio is 30% of the average output, it can be seen that the 2-point probing value after the climate change test is not largely changed and slightly increased.

Further, according to Table 4, it can be seen that with respect to all cases in which the output ratio to the average power of the irradiated laser and the laser irradiation interval are adjusted, the average resistance before the climate test was about 181Ω.

Also, according to Table 5, it can be seen that with respect to all cases in which the output ratio to the average power of the irradiated laser and the laser irradiation interval are adjusted, the average resistance after the climate test was about 309Ω, and except for Example 18 in which the output ratio is 25% of the average output and Example 19 in which the output ratio is 30% of the average output, the average resistance is about 224Ω.

When summarizing the contents in FIGS. 16*a* to 16*d* and Tables 4 and 5, it can be seen that when etching lines are formed on the alignment film by irradiating the laser, even if the transparent electrode is damaged and the conductivity is lost, a conductive silver (Ag) paste is coated in a damaged area of the transparent electrode, and thus, the lost conductivity may be compensated.

Also, the 2-point probing is slightly increased after the climate change test, but the average resistance value thereof has no large difference before and after the climate change test, and as a result, it can be seen that by the same method as the present invention, it can be seen that the liquid crystal chromic device formed with the wire portion may maintain excellent durability even if a rapid change in external temperature occurs.

[Experimental Example 5]—Adhesion Test of Conductive Paste

For an adhesion test of the coated and dried silver paste in Examples 11 to 19, an adhesion test was performed.

Particularly, the adhesion test was performed by forming a square groove having a size of 2.5×2.5 mm$^2$ in a sample after the climate change test with a razor, attaching a test tape (Nichiban) on an area formed with the groove, and removing the test tape.

A result of the adhesion test after the climate change test is illustrated in FIG. 17.

According to FIG. 17, as a result of performing the adhesion test with respect to the groove formed of a total of 100 square pieces, peeling of the dried silver paste from the liquid crystal chromic device was not observed. As a result, it could be seen that the adhesion of the conductive paste of the present invention was not decreased even after the climate change test.

As a result, it can be seen that the silver paste is sufficiently filled in the etching line area formed by the laser irradiation, and as a result, it may be determined that a contact area of the silver paste with the etching line area is increased, and the excellent adhesion is maintained even after the climate test.

SEQUENCE LIST TEXT

10: Substrate
20: Transparent electrode
30: Alignment film
40: Liquid crystal alignment film
50: Conductive paste
100: Ultrashort ultraviolet laser

The invention claimed is:

1. A method for forming a wire portion of a liquid crystal chromic device, the method comprising:
   a) preparing a liquid crystal chromic device by forming a transparent electrode on a substrate, and forming an alignment film on the transparent electrode;
   b) forming two or more etching lines spaced apart by a constant interval by irradiating the alignment film with a laser; and
   c) applying a conductive paste to a valley region of each of the two or more etching lines, wherein the alignment film is irradiated with the laser so that at least a part of the transparent electrode is etched through the two or more etching lines.

2. The method of claim 1, wherein the substrate is a transparent polymer substrate.

3. The method of claim 1, wherein the transparent electrode comprises a conductive oxide.

4. The method of claim 1, wherein the alignment film comprises at least one photoalignment compound selected from a monomolecular compound, a monomeric compound, an oligomeric compound, and a polymeric compound.

5. The method of claim 1, further comprising forming a liquid crystal alignment film formed on the alignment film.

6. The method of claim 5, wherein the liquid crystal alignment film comprises a reactive mesogen.

7. The method of claim 1, wherein the conductive paste comprises at least one of silver paste, copper paste, nickel paste, carbon paste, and aluminum paste.

8. The method of claim 1, wherein the laser is an IR laser or a fiber laser.

9. The method of claim 1, wherein the constant interval between etching lines adjacent to each other is 30 µm or more and 450 µm or less.

10. The method of claim 1, wherein the method for forming a wire portion of a liquid crystal chromic device is a roll-to-roll continuous process.

11. A liquid crystal chromic device comprising:
a substrate;
a transparent electrode provided on the substrate;
an alignment film provided on the transparent electrode; and
two or more etching lines provided on the alignment film, wherein the two or more etching lines are spaced apart by a constant interval, and a valley region of each of the two or more etching lines is coated with a conductive paste, and
wherein at least a part of the transparent electrode is etched through the two or more etching lines in the alignment layer.

12. The liquid crystal chromic device of claim 11, wherein the constant interval between etching lines adjacent to each other is 30 µm or more and 450 µm or less.

13. The liquid crystal chromic device of claim 11, wherein the substrate is a transparent polymer substrate.

14. The liquid crystal chromic device of claim 11, wherein the transparent electrode comprises a conductive oxide.

15. The liquid crystal chromic device of claim 11, wherein the alignment film comprises at least one photoalignment compound selected from a monomolecular compound, a monomeric compound, an oligomeric compound, and a polymeric compound.

16. The liquid crystal chromic device of claim 11, further comprising:
a liquid crystal alignment film provided on the alignment film.

17. The liquid crystal chromic device of claim 16, wherein the liquid crystal alignment film comprises a reactive mesogen.

18. The liquid crystal chromic device of claim 11, wherein the conductive paste comprises at least one of silver paste, copper paste, nickel paste, carbon paste, and aluminum paste.

* * * * *